(12) United States Patent
Reetz et al.

(10) Patent No.: US 9,212,805 B2
(45) Date of Patent: Dec. 15, 2015

(54) SPECIAL EFFECTS SYSTEM USING RETROREFLECTIONS TO CREATE AN ILLUSION OF GLOWING TOYS AND PROPS

(71) Applicant: Disney Enterprises, Inc., Burbank, CA (US)

(72) Inventors: Daniel J. Reetz, North Hollywood, CA (US); Quinn Y. Smithwick, Pasadena, CA (US); Lanny S. Smoot, Thousand Oaks, CA (US); Jon Hayes Snoddy, Pasadena, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 212 days.

(21) Appl. No.: 14/055,735

(22) Filed: Oct. 16, 2013

(65) Prior Publication Data

US 2015/0103510 A1    Apr. 16, 2015

(51) Int. Cl.
| | |
|---|---|
| F21V 1/00 | (2006.01) |
| F21V 7/05 | (2006.01) |
| F21V 13/08 | (2006.01) |
| F21V 9/10 | (2006.01) |
| H05B 37/02 | (2006.01) |
| H04N 5/74 | (2006.01) |
| A63J 5/00 | (2006.01) |
| F21S 10/00 | (2006.01) |
| F21V 14/02 | (2006.01) |
| F21Y 101/02 | (2006.01) |
| F21W 131/406 | (2006.01) |
| F21Y 103/00 | (2006.01) |
| F21Y 111/00 | (2006.01) |

(52) U.S. Cl.
CPC ... *F21V 7/05* (2013.01); *A63J 5/00* (2013.01); *F21S 10/00* (2013.01); *F21V 9/10* (2013.01); *F21V 13/08* (2013.01); *F21V 14/02* (2013.01); *H04N 5/74* (2013.01); *H05B 37/0227* (2013.01); *F21W 2131/406* (2013.01); *F21Y 2101/02* (2013.01); *F21Y 2103/00* (2013.01); *F21Y 2111/005* (2013.01)

(58) Field of Classification Search
CPC ......... F21V 7/05; F21V 7/0083; F21V 13/08; F21V 9/10; H04N 5/74
USPC ........................................... 362/84, 744, 235
See application file for complete search history.

(56) References Cited

U.S. PATENT DOCUMENTS

| | | | |
|---|---|---|---|
| 8,746,914 B2 * | 6/2014 | Nelson et al. | |
| 2006/0082988 A1 * | 4/2006 | Riblett et al. | |
| 2012/0294001 A1 * | 11/2012 | Rehn | |
| 2014/0071702 A1 * | 3/2014 | Faber; Petko | |

* cited by examiner

*Primary Examiner* — Andrew Coughlin
(74) *Attorney, Agent, or Firm* — Marsh Fischmann & Breyfogle LLP; Kent A. Lembke

(57) ABSTRACT

A special effects (FX) system for generating a penumbra or glow effect about an object. Briefly, the FX system includes at least one sheet of retroreflective material and a penumbra activator. The penumbra activator is designed to selectively direct light toward a reflective surface of the retroreflective material. For example, the penumbra activator may include an elongated core element extending from a hilt. The body of the core element may include strings or sets of direction light sources, which may be spaced apart along the length of external surfaces of the core element body. A controller is used to operate the light sources such as by sequentially illuminating the lights sources from an end near the base/hilt to an end near a tip/distal end of the core element body, with earlier lit sources remaining on in some cases to cause a light sword blade to grow out of the hilt.

19 Claims, 20 Drawing Sheets

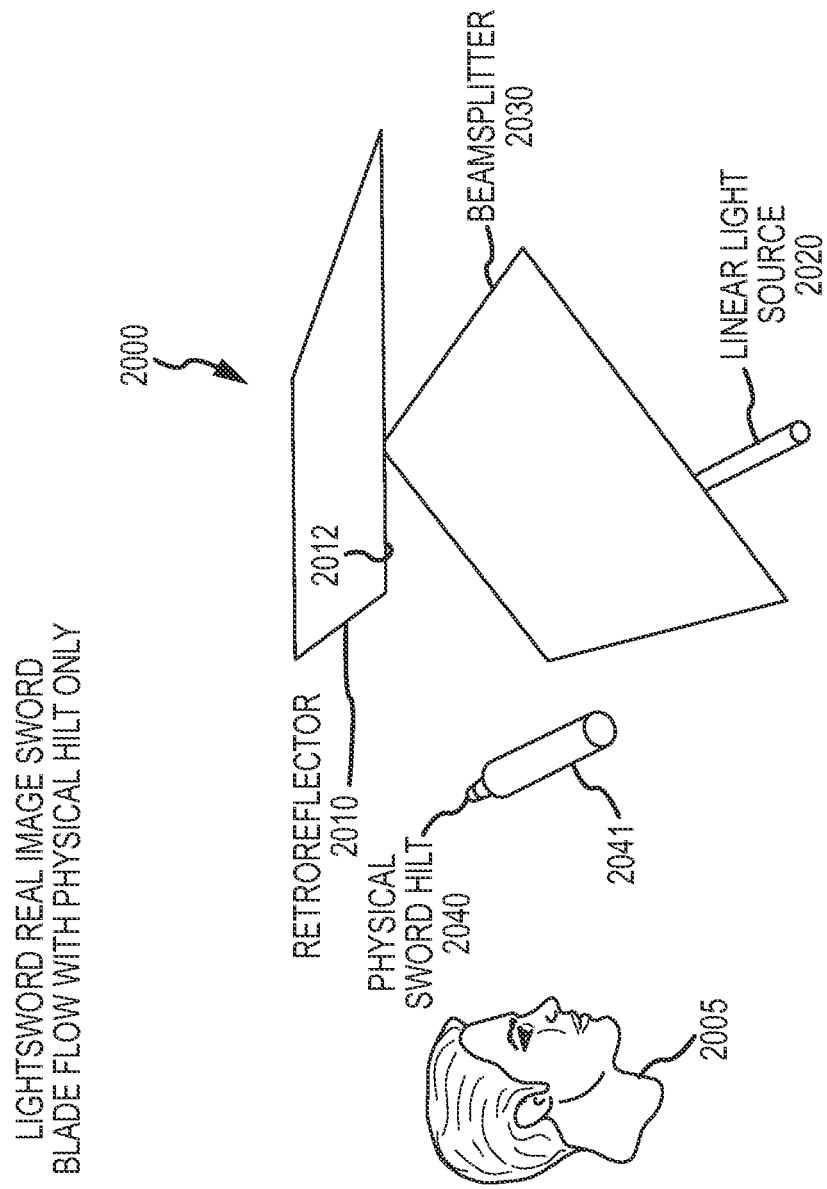

SPECIAL EFFECTS SYSTEM USING RETROREFLECTIONS TO CREATE AN ILLUSION OF GLOWING TOYS AND PROPS

BACKGROUND

1. Field of the Description

The present invention relates, in general, to display systems (or special effects (FX) systems) that use light to create interesting and entertaining effects and illusions, and, more particularly, to a system or assembly configured to cause a handheld or mounted element such as a toy light sword or shaft to appear to the user and others to emit a glowing field of light or to have a penumbra (e.g., a space of partial illumination about its exterior surfaces).

2. Relevant Background

There is an ongoing search in the entertainment industry to find new ways to entertain large and small audiences. Likewise, the toy industry is continuously searching for the next big advance in toy designs to attract new markets to their products. Often, both of these industries will try to build on special effects from the film industry to try to provide an entertaining theatrical display or a new toy that replicates a movie prop or device.

For example, toy designers have struggled for years to provide a shafts or tubes of light such as used for light fights or sword-like duels in many science fiction movies. In the movies, it is easy to create a visual special effect where the light itself becomes a "blade" of a sword and where a blindingly bright light emerges from a sword's hilt when activated. The sword's beam of light (or light blade) is caused to grow to a specific length and then stop.

However, the physical world facing the amusement park, theater, and other live setting in the entertainment industry and facing the toymaker is much different. In this physical world, light simply does not behave in this manner. Theatrical replications of the light sword or shaft, for example, would have to suffer with extending poles with internal lighting that simply do not capture the magic that the audience imagines and remembers from the movies as the poles are often readily visible. Likewise, light saber or similar toys often simply encase a series of lights within a plastic pole or blade (e.g., lights encased in a translucent to transparent plastic shell). The operator of the theatrical prop or child playing with the toy simply flips a switch to turn on the internal lights, but, typically, neither the audience nor the playing child is fooled by the resulting light display.

Hence, there remains a need for generating a special effects system or assembly that is useful in generating a glowing illusion that can be associated with a prop or toy such as a handheld object (e.g., a blade or shaft made out of light extending from a handheld base or hilt). Preferably, the special effects system would be relatively simple and inexpensive to implement such that it can be provided for toys provided to a large market. Further, it often will be desirable for the source of the glow or penumbra about the toy or prop (e.g., nearly any object may be caused to glow according to the present description) to be hidden from observers (e.g., hidden from the toy operator's friends or from a nearby audience watching a scene being performed).

SUMMARY

Briefly, the following description teaches a special effects (FX) system (or glow effect generation assembly or system) that was designed based on the inventors' recognition that retroreflectors can be used to create a glowing effect or a penumbra about edges or sides of a toy, prop, or other handheld or stationary/mounted object (each herein may be labeled a penumbra activator or the like). Particularly, the inventors understood that retroreflective material is designed to reflect light directly back toward a light source but manufacturing and other imperfections result in the reflective surface of sheets of retroreflective material reflecting light back toward a point source in a slightly imperfect matter such that a volumetric halo of light is created about the light source (i.e., a portion of the reflected light misses the light source). The light halo or penumbra about the light source can be seen by a viewer observing the light source and can be used to create a glowing effect for a toy, theatrical prop, or the like that is used to direct light toward the reflective surface of the retroreflector.

Briefly, the FX systems described herein include at least one sheet of retroreflective material and a penumbra activator. The penumbra activator is designed to selectively direct light toward a reflective surface of the retroreflective material. For example, the penumbra activator may include an elongated core element extending from a base (e.g., a sword hilt). The body of the core element may include one, two, three, four, or more strings or sets of directional light sources (e.g., light emitting diodes or the like), which may be spaced apart along the length of external surfaces of the core element body. A controller is used to operate the light sources such as by sequentially illuminating the lights sources from an end near the base/hilt to an end near a tip/distal end of the core element body, with earlier lit sources remaining on in some cases (e.g., to cause a light sword blade to grow out of the hilt/base).

The core element body is thin in width so as to be the same or somewhat wider in width than the light sources so as to fully support the light sources but to not block a significant amount of the reflected light that misses the light source and is useful to create the halo of light. When the penumbra activator is positioned with one of the sets of light sources facing the reflective sheet, the controller operates this set of light sources to direct light toward the reflective sheet surface, which results in the light directed toward the reflective sheet surface being reflected back toward the core body holding the light sources, a majority of the reflected light being blocked by the body/light sources, and a fraction of the reflected light missing the body/sources to create a penumbra about each light sources and its position on the core body surface. As can be seen, the inventors designed the FX system with concern about the light directed toward the retroreflector (as this is the light generating the penumbra) and intentionally relying upon the retroreflector not being perfect in its reflection back to the light source (treated as a set of point sources).

More particularly, a system is provided for generating a glowing effect or light halo about an object. The system includes a sheet of retroreflective material with a reflective surface facing into a viewing space. The system also includes a penumbra activator (or toy or prop with a light support assembly) that is positioned within the viewing space. The penumbra activator includes a support element and a plurality of light sources mounted on a surface of the support element. The light sources operate to direct light towards the reflective surface, and a penumbra is generated adjacent edges of the support element proximate to mounting locations of the light sources on the support element. The penumbra activator further may include a controller for sequentially activating the light sources to modify a length of the penumbra over an operating time for the system (e.g., to grow and shrink a light sword blade or the like).

In some cases, the light sources are provided with spaced apart LEDs aligned linearly along a length of the surface of the support element. In these and other cases, the controller operates the light sources to direct the light toward the reflective surface only when the surface of the support element faces the reflective surface. In such cases, the system may include means for determining when the surface of the support element faces the reflective surface (such as video tracking, magnetic tracking, or IR-based tracking assemblies). The support element can be rotatable by the controller to orient the surface of the support element to face the reflective surface on an ongoing basis during the operating time for the system.

In some embodiments, a color filter is provided proximate to the reflective surface between the reflective surface and the penumbra activator, whereby a color of the penumbra differs from a color of the light directed toward the reflective surface from the light sources. In these and other cases, the system includes a sheet of optically porous material (screen with an open mesh, scrim, transparent film with a dot pattern, and the like) between the reflective surface and the penumbra activator (e.g., on or near the reflective surface of the retroreflective sheet). The system then may also include a video projector projecting an image onto the sheet of optically porous material.

BRIEF DESCRIPTION OF THE DRAWINGS

FIG. 20 illustrates a special effects system in which a beam splitter is combined with a linear light source to provide a penumbra visible relative to an object/toy/prop positioned between a viewer (or viewing space) and the beam splitter (e.g., a system with the light source spaced apart from the penumbra activator).

DETAILED DESCRIPTION

Figure 1:
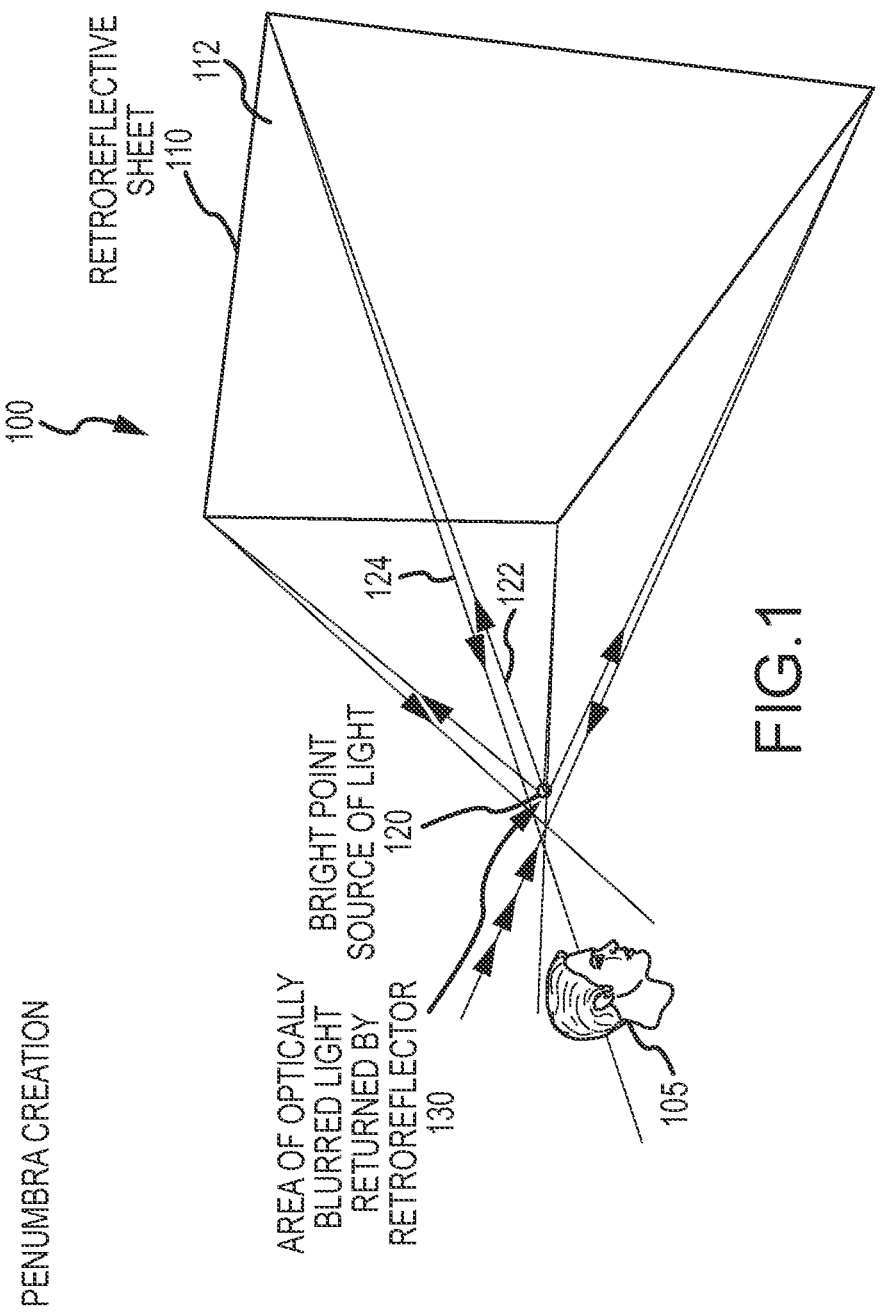
FIG. 1 is functional block diagram or schematic figure of an assembly useful for explaining creation of a penumbra through the use of a sheet of retroreflective material (e.g., a retroreflective sheet or screen)

Briefly, the present description is directed toward systems and assemblies (e.g., special effects (FX) systems or, interchangeably, glowing effect display systems) that makes use of imperfections of retroreflective materials that cause at least a portion of the reflected light to not be reflected directly back to a light source. The FX systems use light sources that can be operated to direct light toward a surface of a sheet of retroreflective material so as to generate a glowing effect or penumbra about the light sources. The FX systems may include toys, props, or other objects supporting the light sources, and the penumbra is selectively created and visible to viewers of the toys, props, or other objects about edges/sides of the portions of these elements that is used to support the light sources.

Prior to turning to a number of exemplary FX systems useful for providing glowing effects, it may be useful to further explain the inventors' ideas in more general terms so as to provide the reader with a solid background of the components that may be combined in a number of ways to provide interesting and exciting lighting effects. The FX system relies on the special properties of low cost retroreflector, which is used as a background or backdrop for areas where the penumbra activator (e.g., a toy or prop light sword) is to be viewed/used. Retroreflector can be purchased in large sheets and is often used to make road signs or is sewn onto safety jackets. The material appears brightly luminous, for example, in the headlights of an approaching vehicle.

The luminous appearance stems from the fact that retroreflective materials are configured to attempt to return any light hitting its surfaces directly back to the light sources. In the case of an approaching vehicle, the retroreflector tries to return the headlight illumination/light back to the vehicle's headlights. Because the retroreflector is imperfect, though, a portion of the light "misses" the headlights. Since the reflected light is headed toward the vehicle and the driver, the driver sees a very large amount of light coming back in their direction and sign/jacket covered with the retroreflective material appears self-luminous. In practicing the present description, nearly any retroreflective material may be utilized in the retroreflective sheets providing retroreflection using corner reflectors or using Cat's eye-type retroreflection elements (e.g., sheets of glass beads or the like) or other retroreflector. Note, the invention and its FX systems work well with nearly any imperfect retroreflective material.

The FX systems taught herein make use of this general phenomenon to good effect to provide a penumbra-based optical illusion. For example, an FX system may include a column of LEDs applied to one side of a very thin (e.g., less than 0.25 inches wide) shaft or core body (e.g., an elongated rod or the like) used to provide a light sword blade. A backdrop of retroreflective material (e.g., a retroreflective sheet) may be provided on some or all of the background surfaces behind or on one side of where the shaft or core body is to be positioned (between the surfaces of the retroreflective sheet and a viewer/audience).

The LEDs are positioned to face the retroreflective sheet and point away from the viewer/audience. The light from the LEDs hits the surface of the retroreflective sheet comes directly back after reflection to the shaft/core body (e.g., blade of the light sword), but some of the reflected light just misses the LEDs and the supporting shaft/core body (e.g., a band of light that is up to about 0.25 to 3 inches or more in width extends about the outer edges/sides of the shaft/core body). In other words, the "miss light" creates a brilliant halo or penumbra along the entire length of the shaft/core body (or along/adjacent the string or set of LEDs by creating a halo associated with each LED). The halo is significantly wider than the shaft/core body (actually existing in the space adjacent to, but outside, the edge of the physical sword shaft or core body on all sides). This ephemeral but very bright light closely matches the look of many movie versions of light-based weapons or light swords but the glowing or penumbra effect is achieved in the physical world in real time.

Many creative and technical capabilities became apparent to the inventors with these concepts recognized and understood. First, the light shaft or elongated penumbra can be caused to appear from the hilt/base by sequentially lighting the LEDs/lights sources on the shaft/core body's surfaces using simple circuitry. Second, since the LEDs on the core body need to be pointed backwards or towards the retroreflective sheet away from the viewer/audience so as to illuminate the retroreflector and create a penumbra or glowing effect, a multi-sided column of LEDS may be used to provide a light blade so at least one of the sets of LEDS/light sources (sides/surfaces of the core body/shaft) is always pointed backwards and towards the retroreflective sheet. This set of LEDs/light sources (the sources facing the retroreflective sheet at a particular point in time during operation of the FX system) may be selectively powered on or lit to create the penumbra on an ongoing basis as the penumbra activator is moved about in space. The inventors have demonstrated automatic circuitry that can determine which side of the core body/shaft is presently facing the retroreflective sheet and then, in response, light or power those LEDs/sources mounted on this side (or make these LEDs brighter (super bright) than those on other surfaces facing the viewer/audience (dimmer but still lit)), which prevents a thin dark line where the LED backs are located.

Third, the penumbra (e.g., a light-based sword blade) may be generated so as to be multicolored. In this case, the FX system may include addressable, color light sources (e.g., LEDs) along the length of shaft/core body. Fourth, the core body may be provided with a front color and then a separate halo/penumbra color by determining which side faces the viewer/audience and which side is presently facing the retroreflective sheet and activating light sources appropriately in response. Fifth, two light swords may be allowed to be used in a duel, and, in the exact area where the light swords or their penumbras cross/collide (which may be determined, for example, by onboard accelerometers, invisible infrared (IR) light, near field radio frequency (RF), electrical capacitance, and the like), the light sources (e.g., LEDs) on the surfaces of the sword body/shaft associated with the crossing/collision can be activated to change color (e.g., blue to white) or otherwise operated to create a desired effect (e.g., to register or show "sparks" or flashes of light).

Sixth, the FX system may include components to hide or disguise the presence of the retroreflective sheet. For example, the retroreflective sheet may have gray reflective surfaces. This surface may be hidden by positioning an optically porous material such a screen with open mesh or a scrim over all or portions of the gray surface. The fine scrim/screen may then be lit with an obliquely positioned light source (relative to the light sources on the shaft/core body) to illuminate the screen but allow continued use of the retroreflective sheet. The projected light may include images/animation in some cases. In other case, the optically porous material may be colored, painted, printed, or the like to take on a desired background setting (e.g., a conventional wall).

FIG. 1 is functional block diagram or schematic figure of an assembly (e.g., FX display system) 100 useful for explaining creation of a penumbra 130 through the use of a sheet of retroreflective material (e.g., a retroreflective sheet or screen) 110. As shown, a simple FX display system or penumbra (or glowing effect) generation system 100 may be used to create and display a penumbra or glowing halo of light 130 about an object viewed by a viewer or audience member 105. The system 100 includes—at its most basic level—a retroreflective sheet 110 with a reflective surface 112 oriented to face a space/volume in which a viewer or audience member 105 is located (e.g., at a viewer or observer location or a first location with the surface 112 being at a second, spaced apart location such as at a backdrop or set piece location).

Further, the system 100 includes a source of light 120 that is positioned between the surface 112 of the retroreflective sheet 110 and the viewer. In other words, the light source 120 is positioned at a third location or position so as to be interposed between the viewer's or first location/position and the surface's or second location/position. For example, the light source 120 may be several feet away from the surface 112 while the viewer 105 may be very close to many feet away from the light source 120 (e.g., the distance between light source 120 and surface 112 may be 3 to 10 feet or the like (or 0 to about 10 feet or more) while the distance between the light source 120 and the viewer 120 may be 0 to 20 to 30 feet or more). In practice, the generation of the penumbra 130 and its size depends on a number of factors including size and brightness of the source 120, the design/type of the retroreflective sheet 110, and the distance between the surface 112 and the source 130 (e.g., the penumbra will be smaller and brighter with a smaller source-surface separation and a larger and dimmer or more diffuse with a larger source-surface separation).

As shown, the system 100 includes a light source 120 that may be a bright point source-type light device such as an LED (white or colored) that is at least partially facing the sheet 110. The system 100 is shown with the source 120 powered on or lit to generate light shown as rays 122 that are directed toward the surface 112 of the retroreflective sheet 110. As discussed above, the retroreflective material of sheet 110 is not perfect such that the light reflected back as shown as rays 124 is directed back towards the location (first location/position) of the source 120 but a portion misses and in all directions about the source 120 to create a light halo or penumbra 130 about the light source 120. This penumbra 130 is an area (or volume) of optically blurred light 124 returned or reflected by the retroreflector 110 and is readily visible to the viewer 105 on all sides or edges of the light source 130.

The viewer 105 can move further away or closer to the light source 120 and continue to see the penumbra 130 as long as the source 120 is operating to direct light 122 toward the surface 112 and as long as the surface 112 is at least partially behind the source 120 (e.g., the source 120 is positioned between the viewer 105 and the surface 110). The light source 120 may be moved about in the space between the viewer 105 and the surface 112, and the viewer 105 may change their point of view and/or viewing angle (move left and right or move up and down) without losing the glowing light effect or penumbra 130 as long as the light 124 is directed toward the surface 112.

Figure 2:
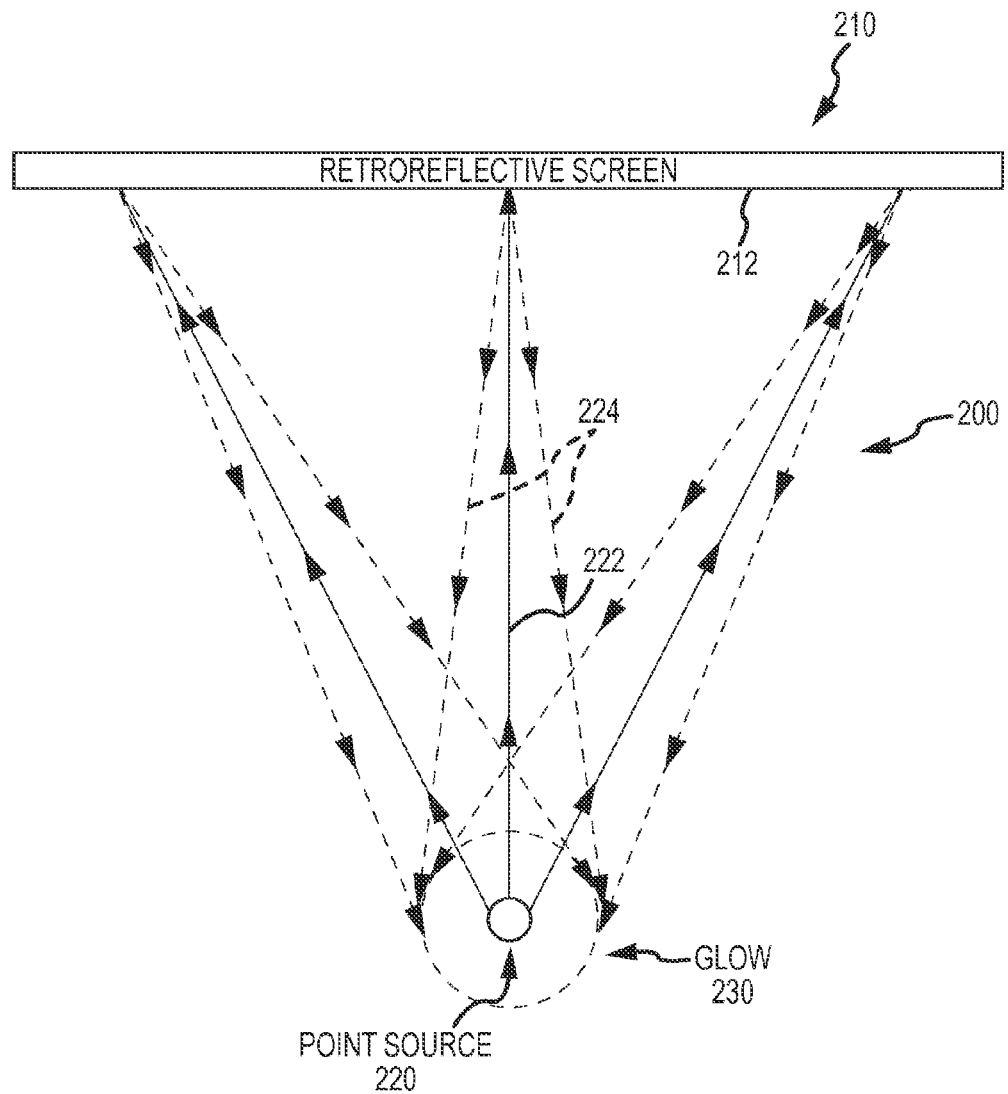
FIG. 2 is a schematic top view of an assembly similar to that shown in FIG. 1 illustrating creation of a penumbra or glowing effect about a point light source.

FIG. 2 is a schematic top view of a portion of an assembly 200 similar to that shown in FIG. 1 illustrating creation of a penumbra or glowing effect about a point light source. As shown, the FX assembly or system 200 includes a retroreflective sheet 210 with a surface or side 212 made up of or containing retroreflectors or retroreflective material (e.g., Cat's eye spheres or the like), and the reflective surface 212 is arranged to face or be exposed to an effect viewing area (with no viewer shown in FIG. 2).

The system 200 further includes a light source 220 (e.g., an LED or other directional light source) that is shown in an operating state (powered on or lit) to generate light 222. The light source 220 may be considered a point source or a directional light source, and, as shown, a plurality of light rays 222 is directed from the source 220 toward the screen's surface 212. Instead of being reflected perfectly back to the source 220, the light 222 is reflected back as a cone of light as shown with dashed lines 224. This cone of reflected light 224 causes a volumetric halo of light 230 to be provided about all sides and surfaces of the point source 230. When viewed from the front (e.g., with the source 220 between a viewer and the screen 210), the glowing effect or volumetric halo 230 appears as a penumbra as the source blocks a portion of the light 224 directed back perfectly or onto the source 230 (and any supporting structure for the source 220 (not shown in FIG. 2)). As can be seen, the glow, glowing effect, halo, or penumbra 230 is created by the light 222 from the source 230 directed toward the reflective surface 212 of the retroreflective sheet/screen 210 (with its imperfect reflective qualities) and not based on light emitted directly from the source that is visible by a viewer in a viewing space.

Figure 3:
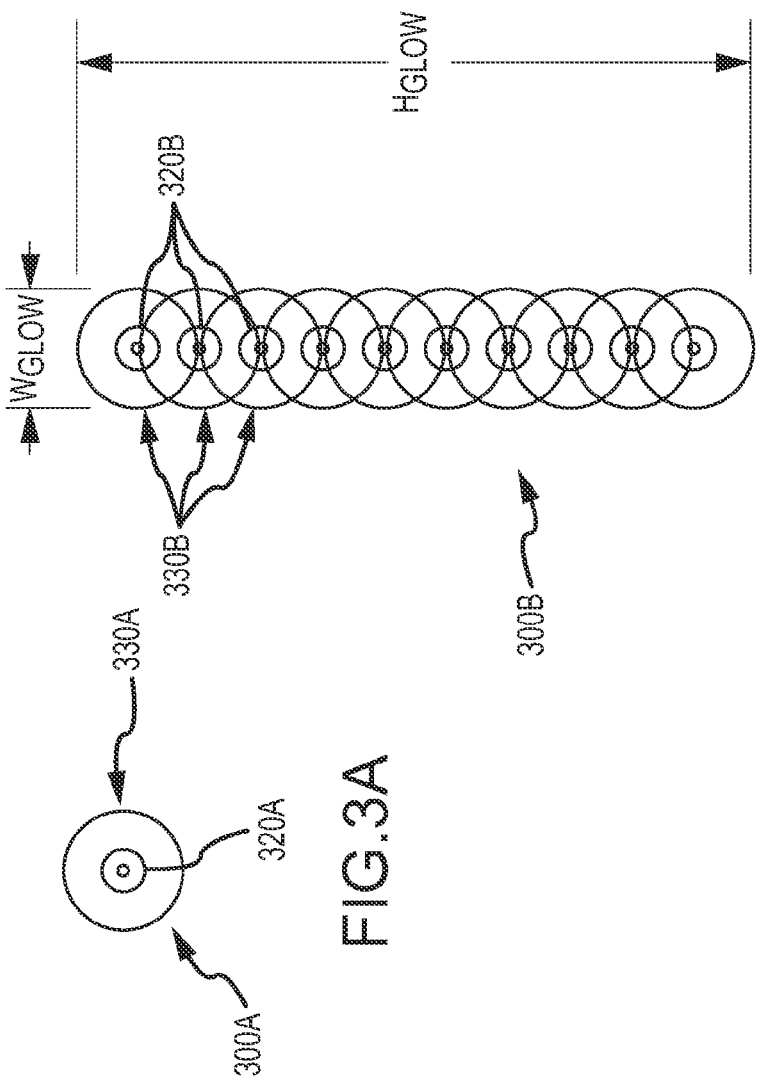
FIGS. 3A and 3B are schematic side or elevation views of an observer's view/perceived imagery using a single point source and using a plurality of linearly arranged/aligned point sources to project light toward a retroreflective sheet (e.g., what an observer may see when looking toward a retroreflective screen and a back side of a point light source and a line of point light sources during their operation to create penumbra or glowing effects)

FIGS. 3A and 3B are schematic side or elevation views 300A and 300B of an observer's view/perceived imagery using a single point source and then using a plurality of linearly arranged/aligned point sources to project light toward a retroreflective sheet (e.g., what an observer may see when looking toward a retroreflective screen and a back side of a point light source and a line of point light sources during their operation to create penumbra or glowing effects). As shown in FIG. 3A with schematic 300A, a viewer may see the back side or surface of a point light source 320A (or of a support for such a source) when it is being operated to direct light away from the viewer toward a retroreflective screen or sheet. Concurrently, though, the viewer also sees a glowing effect or penumbra 330A about the periphery or all sides of the light source 320A, and this penumbra 330A is provided by the light direct imperfectly back to the source 320A or that "misses" the point source 320A. The penumbra 330A of a single point source 320A may take the form of a circular halo or donut shaped volume of light about the source 320A.

Turning to FIG. 3B, penumbras or glowing effects with different shapes and with different sizes (e.g., more length/height) can be provided by using two, three, or more light sources (e.g., a number of LEDs or the like arranged on a support structure). As shown with schematic 300B, a penumbra or glowing effect 330B is created that has a columnar or tube shape by concurrently operating a number of point light sources 320B to direct light toward a retroreflective sheet(s). A viewer can see the back sides or surfaces of the sources 320B (or a support) as it blocks light reflected directly back from the retroreflector. However, a halo or glowing effect 330B is provided and visible to a viewer about the periphery or all sides of each of the light sources 320B.

The light sources 320B may be spaced apart a distance along a line (or other shape) a small enough distance such that the penumbra 330B of two adjacent or side-by-side sources 320B overlaps at least some amount. Then, the overall glowing effect or penumbra for the assembly of light sources 320B may appear to be a single shaft or column of light. With less spacing between light sources (e.g., 0.25 to 1 inches when using LEDs or the like for light sources), a viewer may perceive the set of penumbras 330B as a single glowing effect or shaft of light. The size of each penumbra (diameter or width, $W_{glow}$) will vary based on the size of the light sources 320B and distance (0 to 15 feet with 3 to 10 feet working well in some embodiments) from the retroreflective sheet. Typically, the penumbra or glowing effect 330B is enhanced by providing a thin core or light sources 320B (and the support structure for such light sources) because the width, $W_{glow}$, is limited (e.g., 0.5 to 6 inches on each side of the source 320B) and do not want to block too much of the light with the sources/ support structure). However, it should be remembered that the penumbra 330B is located at or near the light sources 320B but can be seen by a viewer from very large distances (e.g., up to 10 to 100 feet or more away). The length or height, $H_{glow}$, of the glowing effect or penumbra 330B is defined by the number of the sources 320B and their spacing (as well as the height of the retroreflective sheet, which must be behind the sources 320B to create the penumbra 330B), and it is nearly unlimited. So, to provide a penumbra 330B of a desired length or height, $H_{glow}$, one simply needs to combine or use an adequate number of light sources 320B (e.g., to provide a light sword shaft that is 2 to 4 feet long or the like).

Figure 4:
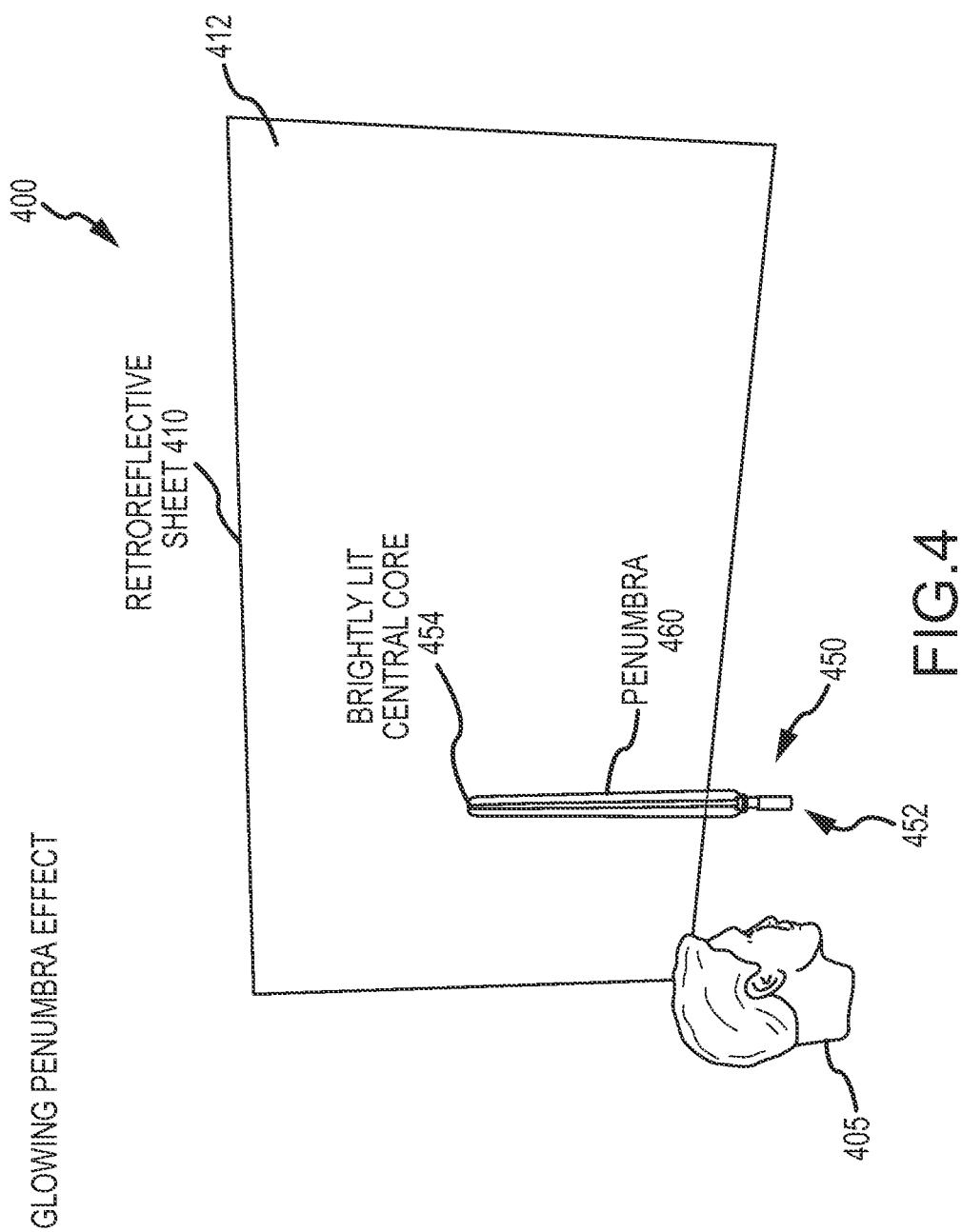
FIG. 4 illustrates a perspective view of an exemplary special effects system (or toy assembly) during operation to provide a penumbra or glowing effect about surfaces of a toy, a prop, or other object (e.g., a penumbra activator, glowing effect controller, or other useful labels) with a light source assembly.

FIG. 4 illustrates a perspective view of an exemplary special effects system (or toy assembly) 400 during operation to provide a penumbra or glowing effect 460 about surfaces of a toy, a prop, or other object (e.g., a penumbra activator, glowing effect controller, or other useful labels) 450 with a light source assembly or central core 454. As shown, the system 400 includes a retroreflective sheet 410 that may be planar or curved and has a reflective surface 412 facing or exposed to view by a viewer 405 in a viewing or operating space of the system 400.

The system 400 further includes a penumbra activator 450 with a handle/base/hilt 452 and the light source assembly 454 extends outward from the hilt 452. The light source assembly 454 may include a light support element or structure upon which a plurality of light sources may be mounted on one or more of its external surfaces. The light sources may be LEDs, electroluminescent (EL) wire (or segments of such wire), fluorescent tubes, or the like that may be arranged in a spaced apart matter on one or more of the support element's surfaces.

The hilt 452 may be used to house the controller for the light sources, and, as explained below, the controller may operate to cause all the lights to be powered on/off together or in some selective manner to achieve a desired effect. For example, only the light sources facing the surface 412 may be lit because only light directed towards the retroreflector 410 contributes to generating the penumbra 460 and powering off lights facing outward toward the viewer 405 helps to disguise or hide the presence of the light sources or achieves a more desirable glowing effect (FIG. 4 shows a lit central core 454 but this may appear as a black/dark line if only light sources facing the screen 410 are lit). The light sources may be of any color, and the penumbra 460 will have the color of the light directed toward the screen surface 412. In some cases, the individual light sources may be sequentially lit from the base up to the tip of the light support element (and vice versa) to cause the penumbra (or light shaft) to grow over time (e.g., toy or prop operator may flip a triggering switch on the hilt 452 that causes the lights to be sequentially lit and grow the penumbra 460 from the hilt 452 to the tip of the light support element).

Figure 5:
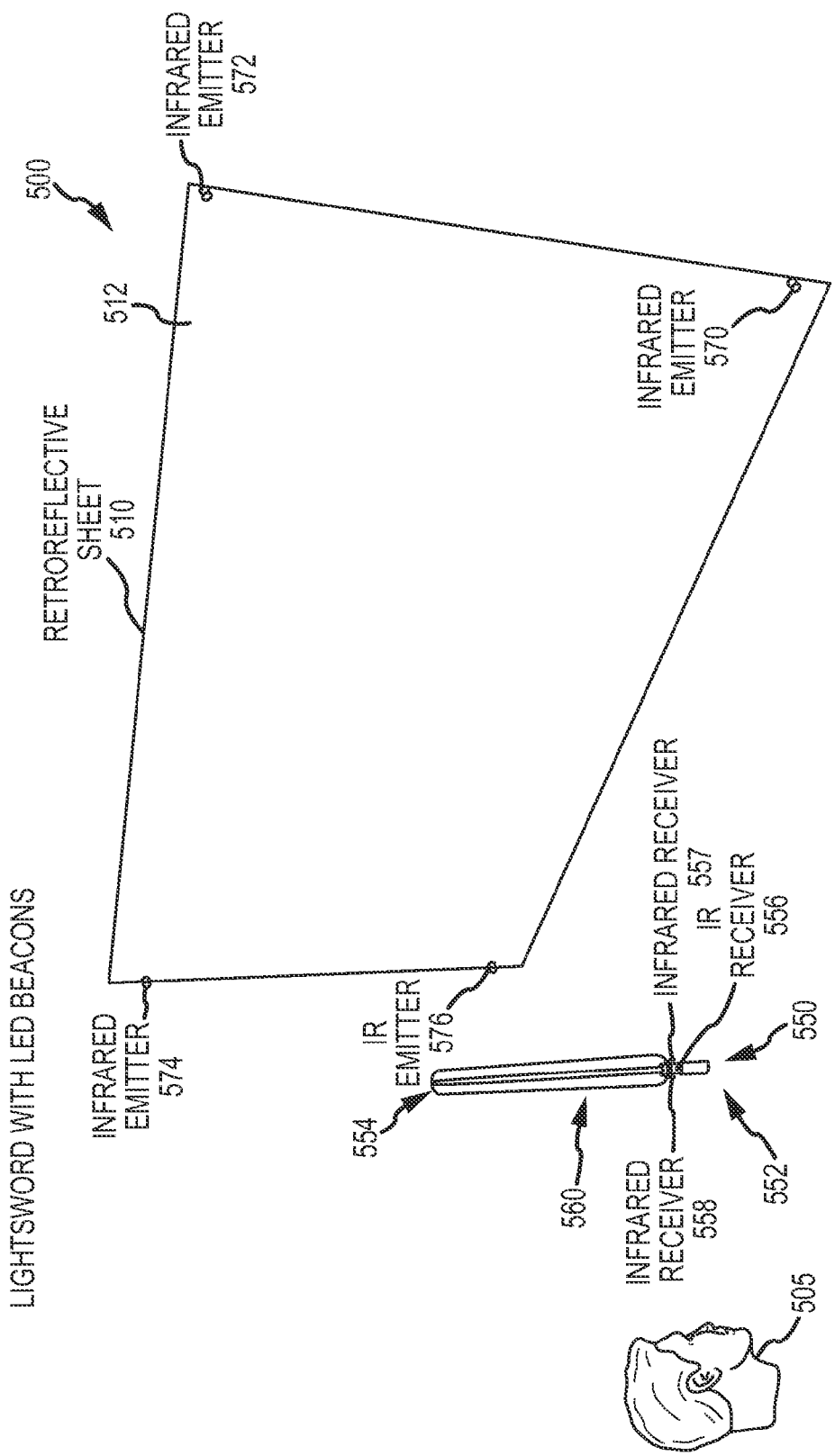
FIG. 5 illustrates another exemplary special effects system similar to the system of FIG. 4 but configured to further disguise a source of light used to generate a penumbra by selectively activating (turning or powering on) a string of point sources facing or directed toward a surface of a retroreflective sheet (turning or powering off other strings or sets of point sources that may be more observable by an audience/observer)

FIG. 5 illustrates another exemplary special effects system 500 similar to the system of FIG. 4 but configured to further disguise a source(s) of light used to generate a penumbra 560. As shown, the system 500 includes a retroreflective sheet 510 with a reflective surface 512 directed into a viewing space to face a viewer 505. A penumbra activator or glowing effect toy/prop 550 is positioned between the viewer 505 and the retroreflective sheet 510. The penumbra activator 550 includes a base or hilt 552, which may include the light source controller/power source, and a light source assembly 554 extends up and out of the base/hilt 552. Again, the light source assembly 554 may include a core body or support element (e.g., an elongated shaft or rod) upon which one, two, or more sets of light sources are mounted on external surfaces/sides (e.g., a string of spaced apart LEDs may be attached in a line or other pattern along the length of each or several sides of the cored body).

As noted above, it may be desirable to use the controller to only power on or light the light sources that are facing or directed toward the reflective surface 512 at any point in time. In some cases, the activator 550 may have its base 552 mounted on a turntable or even be stationary. In such cases, the movement of the turntable could be tracked to determine which side of the core body of light source assembly 554 was facing the screen 510. However, in many applications, the penumbra activator 550 may be designed to be moved about the space between the viewer 505 and the surface 512, and the movement may include rotation of the base 552 and attached light source assembly 554 such that any side/surface of the core body of the light source assembly 554 may be facing or directed toward the screen surface 512 at any time.

Hence, there is a need for the system 500 to be configured to be able to determine which side of the light source assembly 554 is facing toward the screen surface 512 and, based on this determination, to activate the set of light sources mounted to that side of the core body to direct light only or mostly at the screen surface 512 to create the penumbra 560 (and not shine any or as much light directly toward the viewer 505). To this end, FIG. 5 shows that the system 500 includes a number of infrared (IR) emitters 570, 572, 574, 576 on or near the reflective surface 512, and these emitters 570, 572, 574, 576 operate on an ongoing or periodic basis to emit IR light outward into the viewing or operating space containing the penumbra activator 550. The activator 550, in turn, includes an IR receiver 556, 557, 558 associated with (or on or coplanar with) each of the core body sides of the light source assembly upon which a string or set of light sources is mounted. The controller in the hilt 552 may then be adapted to respond to an output signal from one of the IR receivers 556, 557, 558 indicated it has received IR light from one or more of the IR emitters 570, 572, 574, 576 by powering on the set of light sources on the side corresponding to the IR receiver 556, 557, 558 and by powering off (or at least dimming) the other sets of light sources, which may now be facing the viewer 505. Such control may be very timely to provide real time and active control even when the penumbra activator 550 is moved and rotated quickly in front of the screen 510.

Figure 6:
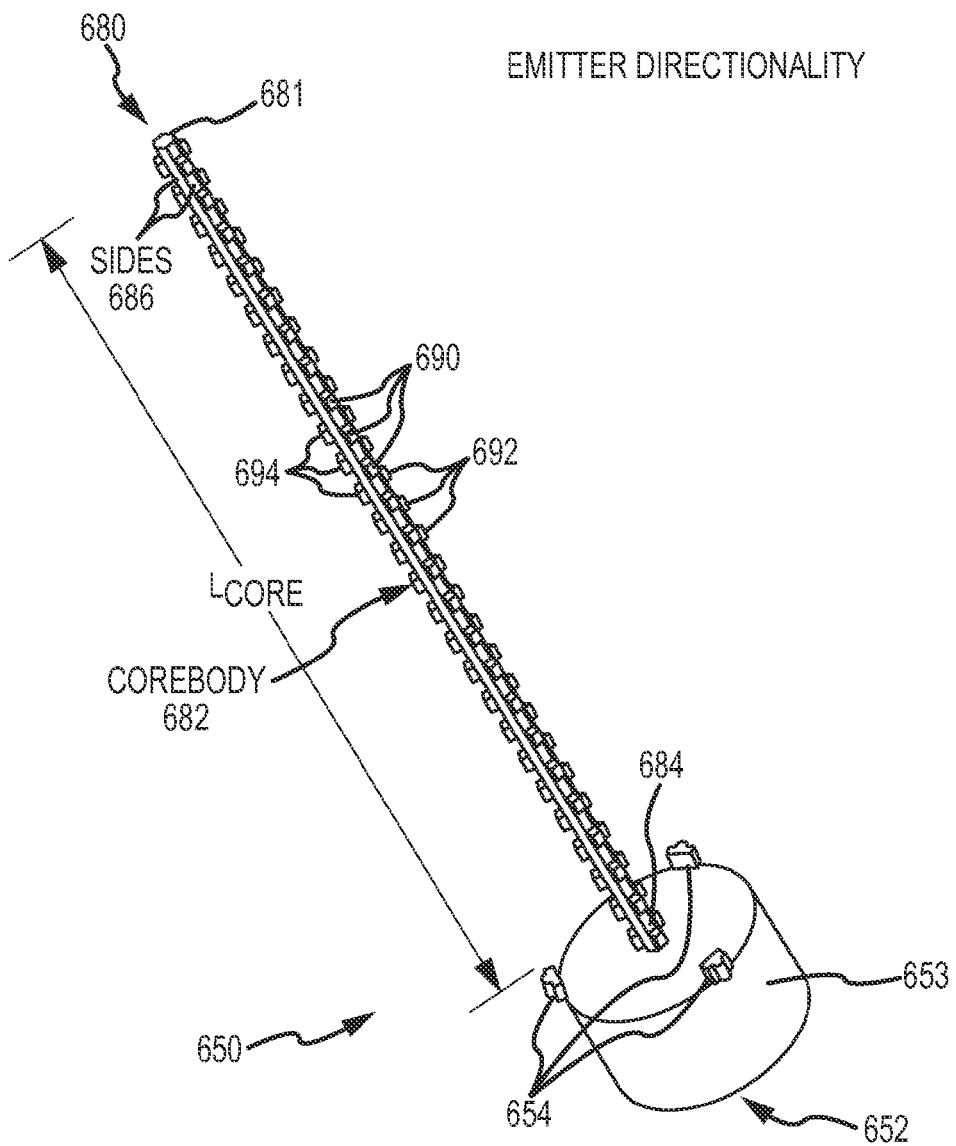
FIG. 6 illustrates a perspective view of one embodiment of a penumbra activator that may be used with the system of FIG. 5 to selective create a penumbra or glowing effect using emitter directionality.

FIG. 6 illustrates a perspective view of one embodiment of a penumbra activator 650 that may be used with the system 500 of FIG. 5 to selective create a penumbra or glowing effect using emitter directionality. As shown, the activator 650 includes a base or hilt 652 with a body or housing 653, which may include a light source controller for selectively lighting or powering light sources on and off according to a predefined pattern (sequentially from base at a predefined rate, all sources on a side at one time, in a flickering on/off pattern over time, and so on) to generate nearly any desired penumbra effect.

As shown, a set of sensors (e.g., IR receivers) 654 are provided about the periphery or outer surface of the base housing 653, with the number of sensors 654 matching the number of separately controlled sets of light sources 690, 692, 694 and being positioned so as to aligned with one of these sets of lights sources 690, 692, 694 (e.g., to be coplanar or the like such that when a set of the light sources are facing a direction so is the corresponding sensor). During operation, when a sensor 654 receives a signal from a beacon (e.g., IR transmitter) on or near a retroreflective screen, the controller processes the output of the sensor 654 and activates the corresponding light source column/string/set 690, 692, or 694.

The light source assembly 680 includes a core body or support element 682 that may be configured as a rod or elongated shaft, as shown, with a first end 683 distal to the base housing 653 and with a second end 684 mating with the housing 653. The core body 682 may have a length, $L_{Core}$, of several inches up to several to many feet with some embodiments using a core body 682 that is 2 to 4 feet long. The core body 682 has a number of sides or faces 686 (e.g., such as three to six (as shown) or more), and the light source assembly 680 includes a set or string of light sources 690, 692, 694 on a like number of these sides 686 (e.g., on every other one of these surfaces/sides 686 so as to space apart the light sources about the periphery of the core body 682).

Each set of light sources 690, 692, 694 may extend from base 652 (from end 684 of the core body 682) along the length or a portion of the length of the core body 682 (to the distal end 683 of the core body 682). The light sources 690, 692, 694 may abut each other in each set 690, 692, 694 or may be spaced apart along the core body as shown (e.g., spaced apart 0.25 to 1 inches or the like). In operation, the light sources in each set 690, 692, 694 may be sequentially powered on or off by the controller, and, as discussed, only the set 690, 692, 694 that is facing a retroreflector as determined using the sensors (e.g., photodetectors) 654. In an alternate embodiment, the sensors 654 may include IR emitters adjacent to the IR receivers and use the retroreflection of the screen to return IR light to the IR receivers (e.g., do not necessarily need IR transmitters on/near the IR screens).

Figure 7:
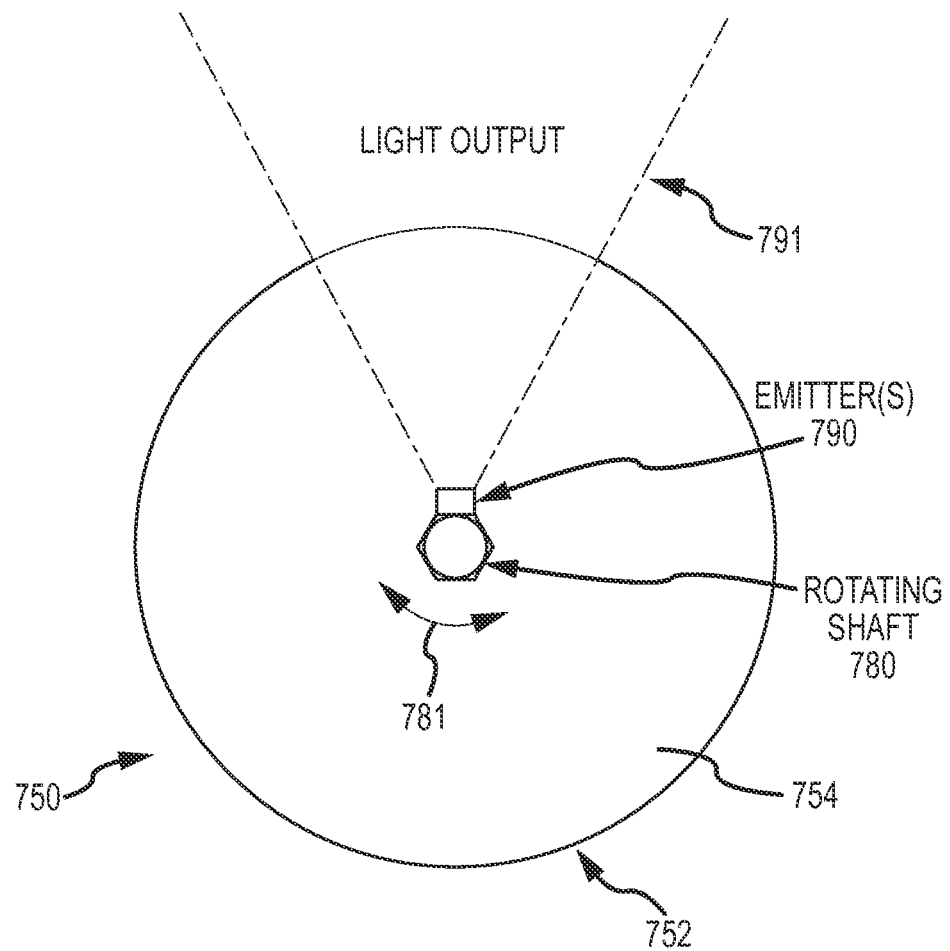
FIG. 7 is a top view of another embodiment of a penumbra activator that may be used in the special effects systems of the present description and includes a rotating or rotatable central core for directing or targeting the light sources toward a reflective surface of a retroreflective sheet.

FIG. 7 is a top view of another embodiment of a penumbra activator (or anisotropic emitter) 750 that may be used in special effects systems of the present description. FIG. 6 showed an activator that selectively switched between strings/sets of light sources to direct light toward a retroreflector, but penumbra activator 750 is configured to direct light 791 toward a retroreflector by rotating/moving (or redirecting) the light sources/emitters 790. To this end, the penumbra activator 750 includes a rotating (as shown with arrow 781) or rotatable central core 780 extending outward from a surface/side 754 of a base/housing 752.

Figure 8:
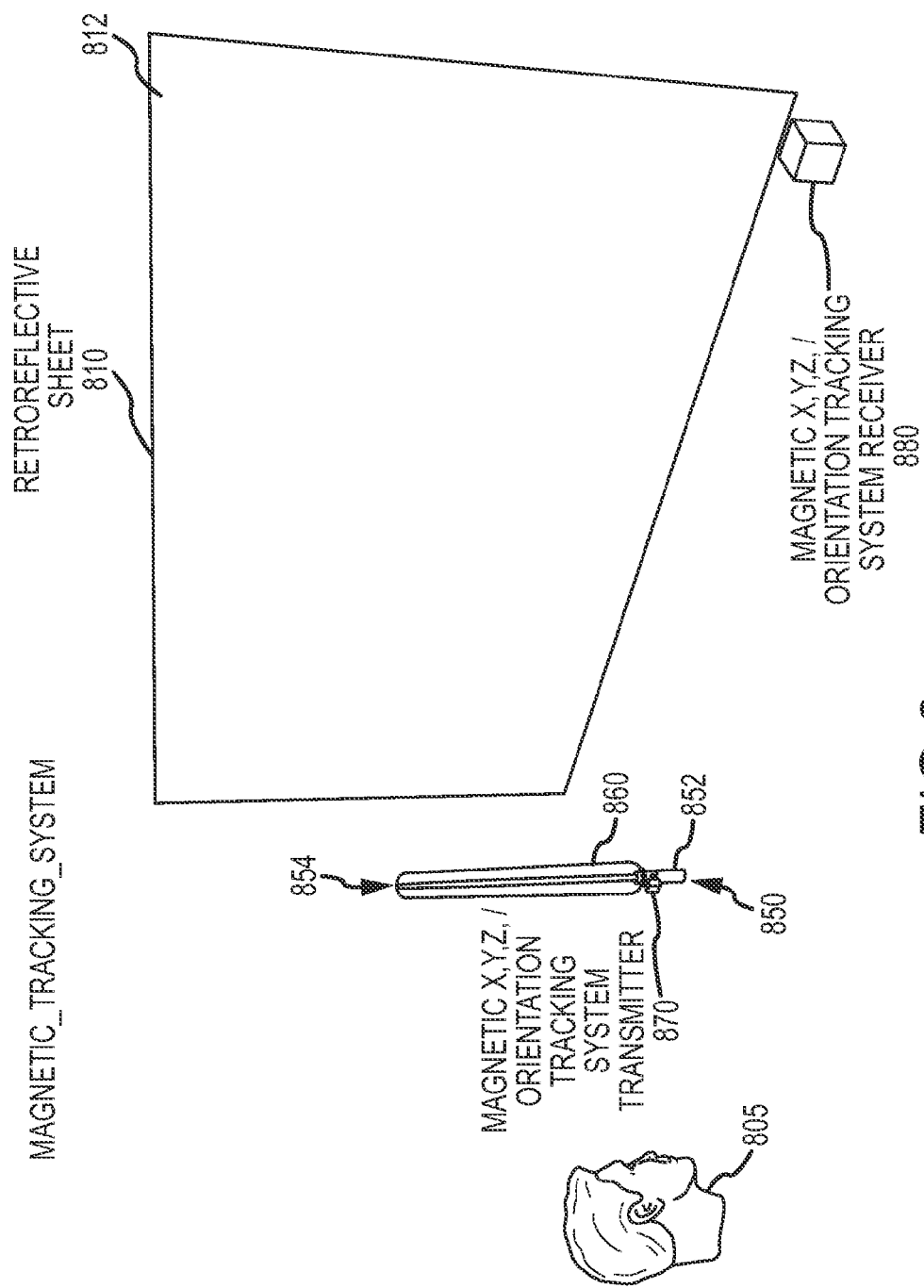
FIG. 8 illustrates a special effects system that uses a magnetic tracking system and a magnetic orientation assembly on the penumbra activator (or lighted sword) to orient the light sources toward the surface of the retroreflective sheet (and away from a viewer)

The penumbra activator 750 may respond to determination of its orientation relative to a retroreflective sheet (not shown) by rotating 781 the core body/shaft 780 to direct or target the light sources 790 toward a reflective surface of a retroreflective sheet. For example, a motor in base 752 may get signal to rotate 781 the shaft 780 toward a screen (with the input for determining rotation being IR emitter-based in some systems as shown in FIG. 6, magnetic tracking as shown in FIG. 8, or some other direction sensing methodology known and used by those skilled in the arts). In this way, only one set of light sources 790 extending along one surface of the core body 780 may be used to generate a penumbra by maintaining the emitters 790 in screen-facing direction. However, other embodiments may include two or more sets of emitters 790, such as with two or more colored lights, that are selectively directed toward the screen over time by controlled rotation 781 of the shaft/core body 780 by a motor/controller in base 752 (e.g., rotate 781 to keep red string 790 facing the screen during a first operating period and rotate 781 to keep blue string 790 facing the screen during a second operating period even though the base 752 is moved/rotated within the viewing space).

FIG. 8 illustrates a special effects system that uses a magnetic tracking system and a magnetic orientation assembly on the penumbra activator (or light saber) to orient the light sources toward the surface of the retroreflective sheet (and away from a viewer). The system again is adapted to display to a viewer 805 a penumbra or glowing effect 860 about a central core body of a light source assembly 854. To this end, the system 800 includes a retroreflective sheet 810 with a reflective surface 812 facing toward the viewer 805. The system includes a penumbra activator 850 positioned in an operating or viewing space between the viewer 805 and the surface 812 of the sheet/screen 810. The activator 850 includes a hilt 852 with a controller (not shown) for selectively operating one or more sets of light sources on one or more surfaces of the core body of the light source assembly 854. Light directed toward the surface 812 creates a penumbra 860 when it is imperfectly reflected back toward the light source assembly 854 (e.g., some light misses the core body and light sources and is visible to the viewer 805 about the sides/edges of core body of assembly 854).

To allow selective operation of light sources facing the screen 812 in source assembly 854 (or rotation of shaft to redirect light sources as shown in FIG. 7), the system of FIG. 8 is shown to include a receiver 880 for a magnetic tracking system (e.g., a magnetic X, Y, Z/orientation tracking system) positioned proximate to the screen 810 and a transmitter 870 on the hilt/base 852 of the penumbra activator (e.g., a magnetic X, Y, Z/orientation tracking system transmitter). The magnetic tracking system or its receiver 880 may be programmed or fed knowledge or the location and orientation of the screen surface 812, and, during operation of the system 800, the magnetic tracking system is used to provide information (position and angle tracking data) to a controller in the hilt 852 indicating an orientation of the light source assembly 854 relative to the screen surface 812 (i.e., to define which face or side of the core body is facing the screen 810). The controller may then use this determination to selective light one or more sets of the light sources (e.g., a string of LEDs on a side facing the surface 812 is lit while other strings are power off or dimmed to achieve a desired penumbra or glowing effect 860 about the light source assembly 854). IR or magnetic tracking may be used in the FX systems while other embodiments may use video tracking (e.g., computer vision system) or another orientation sensing device/assembly to tell which way a light source assembly is facing relative to a retroreflective screen.

With a general understanding of how FX systems may be used to create glowing effects or penumbras, it may be useful to explore a variety of specific implementations and features of FX systems that may be used to achieve a particular visual effect such as to better hide the support structure for the light sources or to provide a penumbra with a particular color (which may be varied over time).

Figure 9:
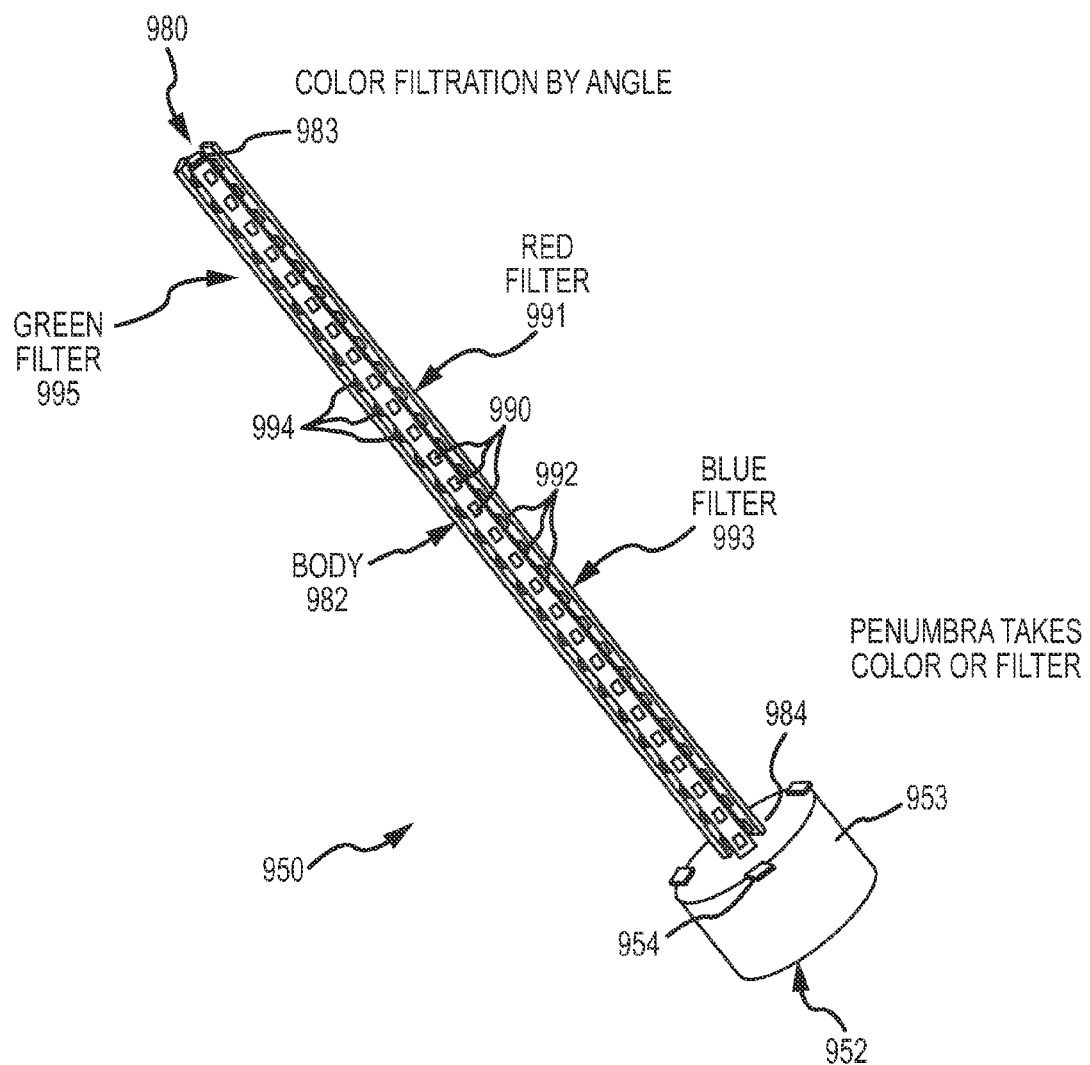
FIG. 9 illustrates a perspective view of another embodiment of a penumbra activator that includes differing color filters covering all or portions of each set or string of point light sources.

FIG. 9 illustrates a penumbra activator 950 that is configured to provide color filtration by angle. As shown, the activator 950 includes a base 952 with a housing/body 953 that may be used to contain a controller and/or power sources for light sources. On the base housing 953, a number of IR receivers 954 are provided for allowing determination of the orientation of the base housing 953 and interconnected and supported light source assembly 980 relative to a retroreflective sheet on or near which a set of IR transmitters are provided and operated. The activator 950 further includes the light source assembly 980 with a core body or shaft 982 that extends a length from distal end 983 to end 984 proximate to the base housing 953. The elongated core body 982 has a number of sides or faces, and the light source assembly 980 includes first, second, and third sets 990, 992, 994 of light sources (e.g., LEDs or other selectively and independently operable light sources such that each set may be operated independently and each LED or other source within each set may, in some cases, be separately powered on and off).

To create three differently colored penumbras or glowing effects, the light source assembly 980 includes three different color filters/screens 991, 993, 995 that are used to cover the three sets 990, 992, 995 of light sources. For example, filter 991 may be a red filter, filter 993 may be a blue filter, and filter 995 may be a green filter such that depending on which set of light sources is facing the retroreflective sheet the generated penumbra will either be red, blue, or green as the penumbra takes the color of the filter 991, 993, 995 covering the light sources facing the retroreflective sheet (and lit by the controller in base 952 to direct light toward the retroreflector).

In another embodiment, a colored filter tube is provided about the sets 990, 992, 994 and core body 982, and the filter tube is rotatable by the controller in base 952 to selectively apply different colors to any of the light sources (e.g., three or more colored filters may be provided in tube that may be rotated to provide different colored penumbras for different operating periods even if activator 950 is rotated or reoriented relative to the retroreflector). For example, the filter tube may be one color for 120 degrees, a second color for a next 120 degrees, and a third color for a final or third 120 degrees. In these embodiments and in the embodiments shown in FIG. 9, the filters may also provide two or more colors along the length of the core body as it may be desirable to provide a penumbra having two or more colors along its length.

Figure 10:
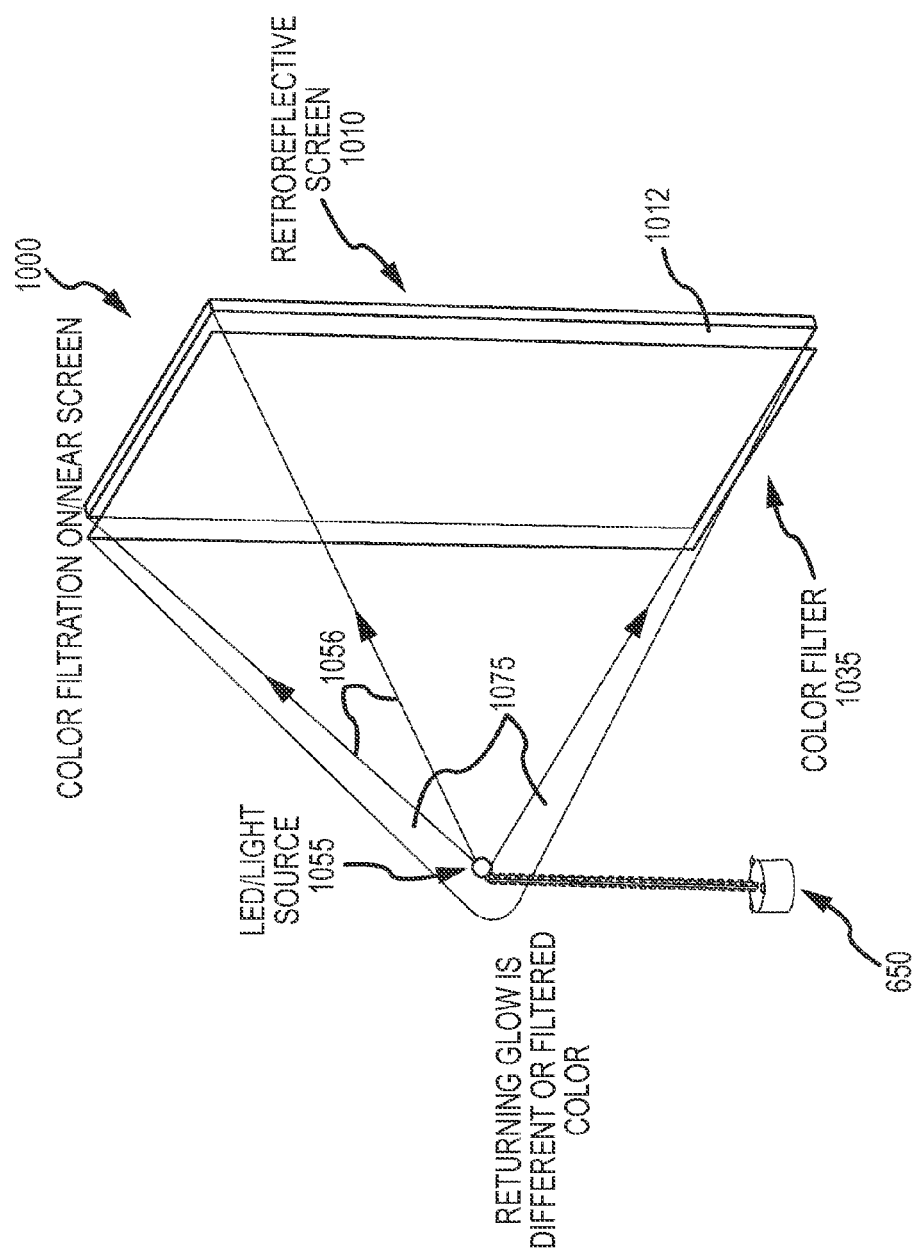
FIG. 10 illustrates a special effects system using color filtration on or near the surface of the retroreflective sheet or screen to create a penumbra or glowing effect with a select color(s) that may differ from the light emitted from light source(s) on the penumbra activator.

FIG. 10 illustrates a special effects system 1000 using color filtration provided with a color filter 1035 placed on or near the surface 1012 of a retroreflective sheet or screen 1010. The color filter 1035 is used to create a penumbra or glowing effect 1075 with a select color(s) that may differ from the light 1056 emitted from light source(s) 1055 on the penumbra activator 650. In one example, the color filter 1035 is a colored gel that is transparent and is placed over all or portions of the surface 1012 to create a desired color for penumbra 1075 (e.g., red penumbra 1075 even though white or a different color LED are used for light source 1055.

The filter 1035 may provide one color or two or more colors may be provided with the color filter 1035 such that the penumbra 1075 may differ as the penumbra activator 650 is moved over differing portions of the screen 1010 and its filter 1035. The color filter 1035 may be placed directly onto the screen surface 1012 or be spaced apart some distance between the surface 1012 and the activator 650. Hence, it can be seen that the penumbra may be colored by selecting the light sources, by providing color filtration at the penumbra activator, and/or by providing color filtration at or near the retroreflective sheet.

Figure 11:
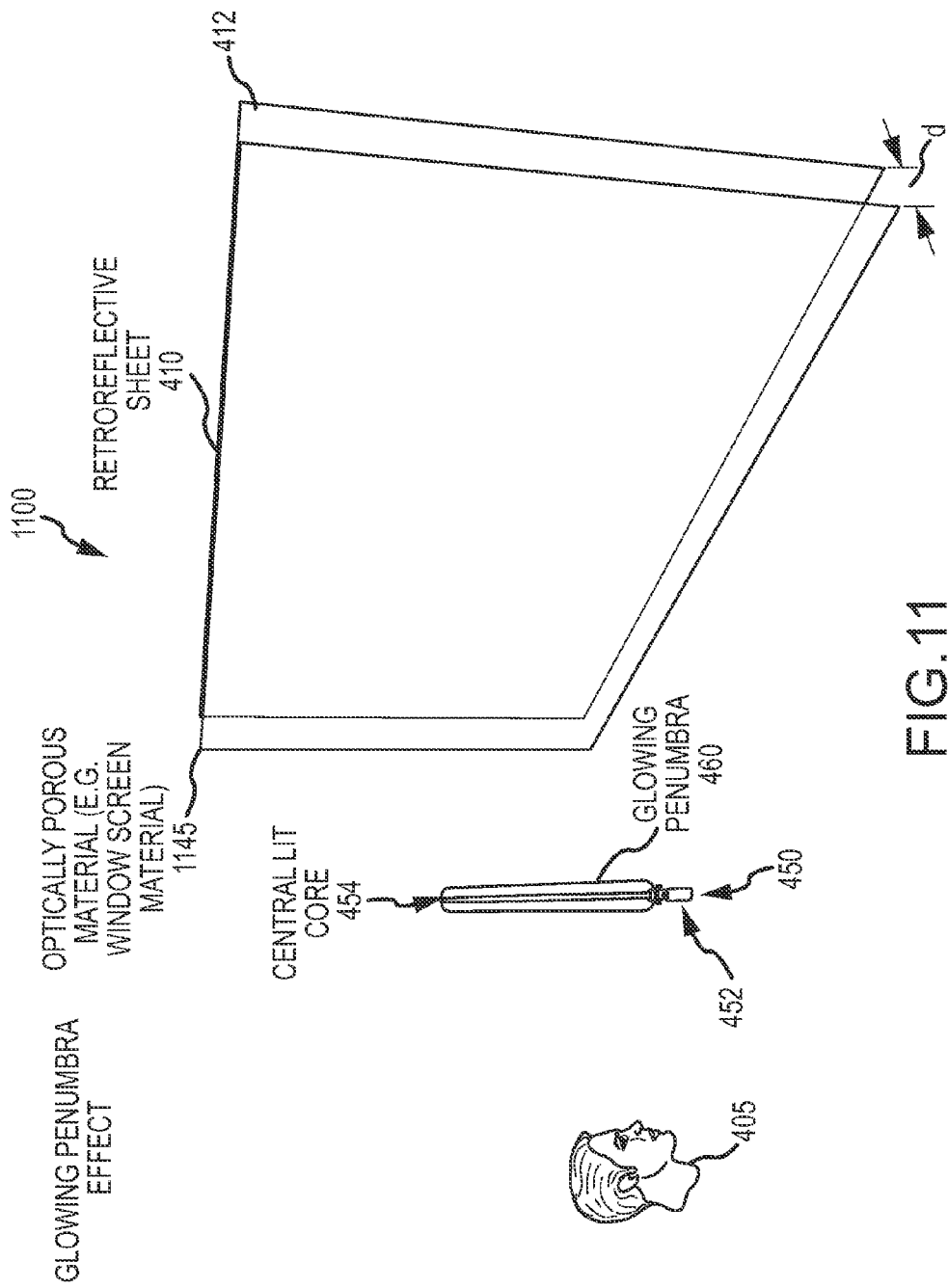
FIG. 11 illustrates a special effects system that includes an optically porous material sheet or film on or near the reflective surface of the retroreflective sheet.

FIG. 11 illustrates a special effects system 1100 that includes an optically porous material sheet or film 1145 on or near the reflective surface 412 of the retroreflective sheet 410. System 1100 is shown to use or include a number of the same components from system 400, but the inclusion of the optically porous material 1145 is useful to disguise the presence of the retroreflective sheet 410. Retroreflective sheet 410 may have a reflective surface 412 that is gray with visual characteristics that may alert one skilled in the art to how the FX system 400 is operating to create the penumbra 460 and, further, a gray background may not be desirable in many settings. Hence, the sheet of optically porous material 1145 may be applied to or spaced apart a small distance, d, from the surface 412 to hide or disguise the surface 412 without significantly altering its operation (e.g., reduce reflection by 0 to 10 percent or the like from the activator 450).

A number of optically porous materials may be used to implement the sheet 1145. For example, the optically porous material sheet 1145 may be provided with a metal, plastic, or other material screen that has very open mesh such as that found in conventional window screens for residential use. The screen may be colored or a pattern/image may be printed or painted on it to provide a desired back drop for the penumbra activator 450, when the optically porous material sheet 1145 is lit or illuminated by a source other than the light source assembly of activator 450. For example, ambient or environmental light may be used to illuminate the sheet 1145 or some other light source that is oblique to the directed light from penumbra activator 450. In other cases, the sheet 1145 is provided using a transparent film with a plurality of dots blocking a portion of received light and for displaying an image or pattern when illuminated. In other settings, theatrical scrim material may be positioned between the viewer 405 and the surface 412 to hide the presence of the retroreflective sheet 410.

Figure 12:
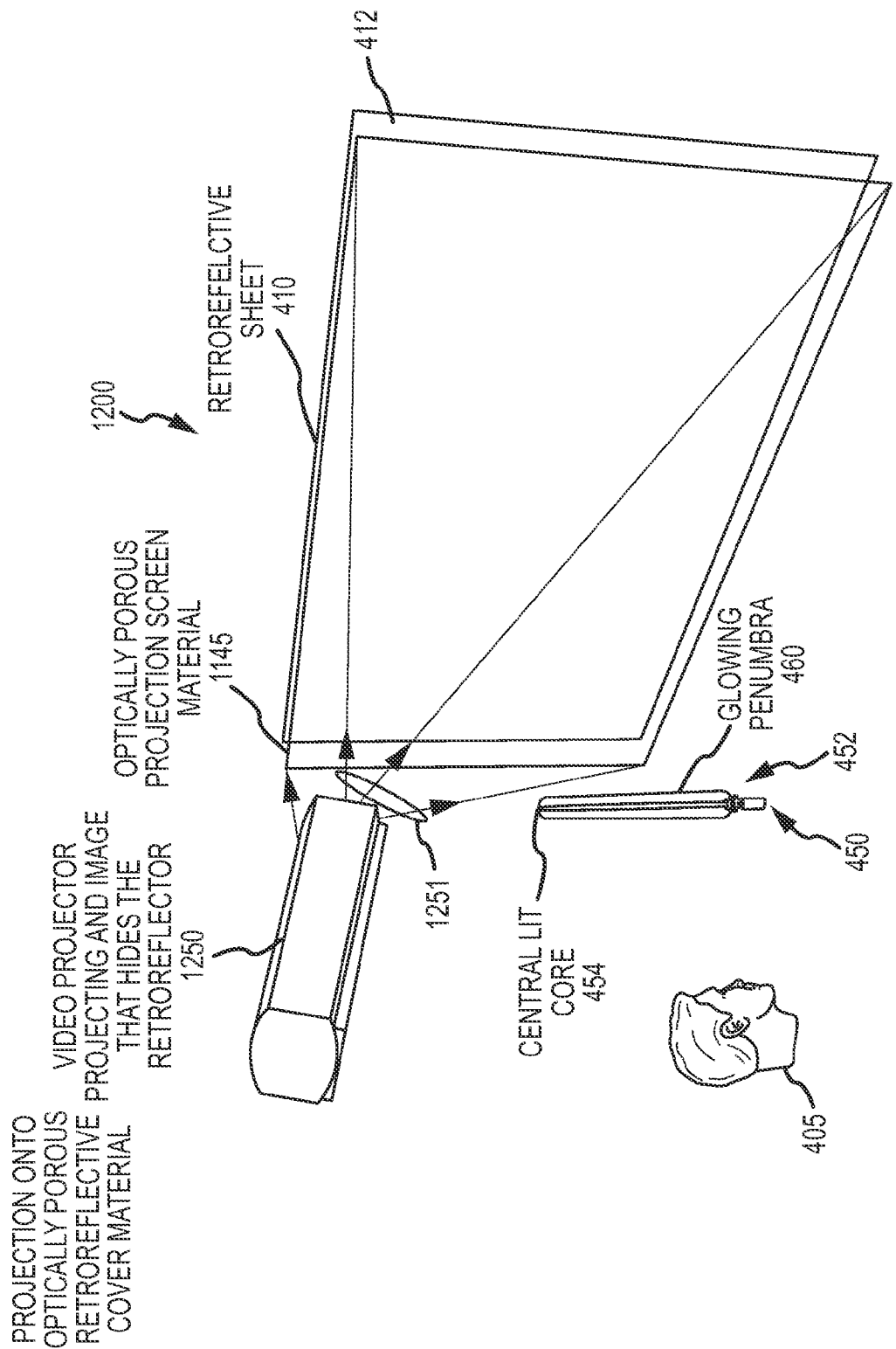
FIG. 12 illustrates a special effects system similar to that of FIG. 11 but further including a projector for projecting onto a projection screen positioned between the retroreflective sheet and the penumbra activator to hide the presence of the retroreflective sheet or retroreflector.

FIG. 12 illustrates an FX system 1200 that builds on the system 1100 to further disguise the retroreflective sheet 410. In system 1200, a video projector 1250 is provided that is selectively operated to project light 1251 onto the optically porous material sheet 1145. Even though the sheet 1145 may be formed of an open mesh screen or other material that is porous to light, the viewer 405 perceives the images/patterns or content provided by the projected light 1251 rather than the presented of the surface 412 on the retroreflective sheet 410. In the system 1200, it is desirable for the projector 1250 to be positioned off to one side of the retroreflective sheet 410 such that it is not blocking the light from the penumbra generator 450 and is not blocking the view of the surface 412 and activator 450 from the viewer 405.

In the systems discusses above, a single retroreflective sheet has been shown in each system and this sheet has been shown to be planar. The sheet may also be nonplanar such as arcuate or curved about a viewing or operational space for a penumbra activator (e.g., a theatrical stage or the like). Also, two or more sheets of retroreflective material may be used to provide the reflective surface or surfaces behind a penumbra activator. Since it is undesirable for any non-retroreflective material or object to pass between the retroreflector and the activator, actor's/operator's clothing and set/prop items may also be covered with retroreflective material such there are no blockages of the directed/reflected light that may cause breaks or skips in the penumbra generation as a penumbra activator is moved about a space.

Figure 13:
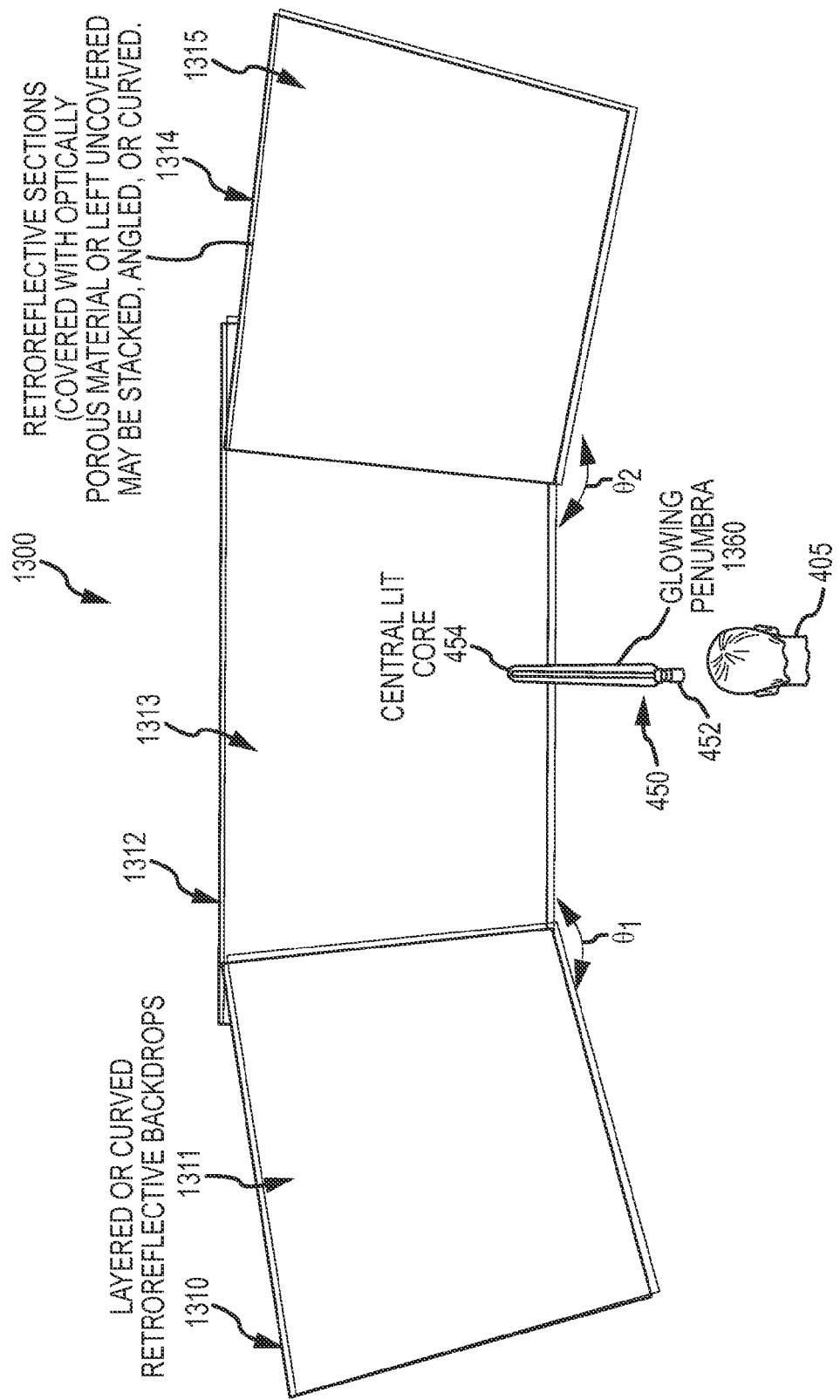
FIG. 13 illustrates another embodiment of a special effects system that is configured to include two, three, or more (three shown) retroreflective sheets or sections that may be angled relative to each other to provide a continuous and "curved" backdrop for a penumbra activator to increase the number of locations from which the penumbra may be viewed.

With this in mind, the FX system 1300 is shown to include the penumbra activator 450 to generate a glowing penumbra 1360 visible by a viewer 405 about a central lit core body or light source assembly 454. The activator 450 is positioned between the viewer 405 and a retroreflector including a first retroreflective sheet 1310 at an angle, $\theta_1$, relative to a second retroreflective sheet 1312, at an angle, $\theta_2$, relative to a third retroreflective sheet 1314. For example, the angles, $\theta_1$ and $\theta_2$, may selected from the range of 15 to 90 degrees to define a "curved" partially surround operating space for the activator 450. The three sheets 1310, 1312, 1314 form a multi-faceted back drop for the penumbra activator 405 that allows the activator 405 to be moved laterally and also to allow the viewer 405 to move and see the penumbra 1360 over a larger viewing angle (as the retroreflective material is behind the activator 450 over a larger range of viewing angles when compared with use of a single planar sheet). Optionally, one or more of the sheets 1310, 1312, 1314 may be covered with optically porous material 1311, 1313, 1315 as discussed above that may be colored/printed/painted and/or be illuminated with a light source and/or a projector (not shown in FIG. 13).

In some applications, it may be desirable to enhance the penumbra generation effect by modifying or designing the light source assembly to hide the existence of the light sources and/or their support structure on the base/hilt. For example, the penumbra activator 650 without further modification/components creates an effective penumbra about the edges of the core body 682, but a viewer can see a black line or rod where a side/surface opposite the light sources presently being used to create the penumbra. One technique for getting rid of this black rod is to light the light sources facing the viewer but with less power or with dimmer light. Hence, instead of completely shutting off the power to light sources not on the surfaces facing the retroreflective material sheet these light sources can be dimmed (e.g., to a level that matches or is less than the illumination levels of the penumbra).

Figure 14:
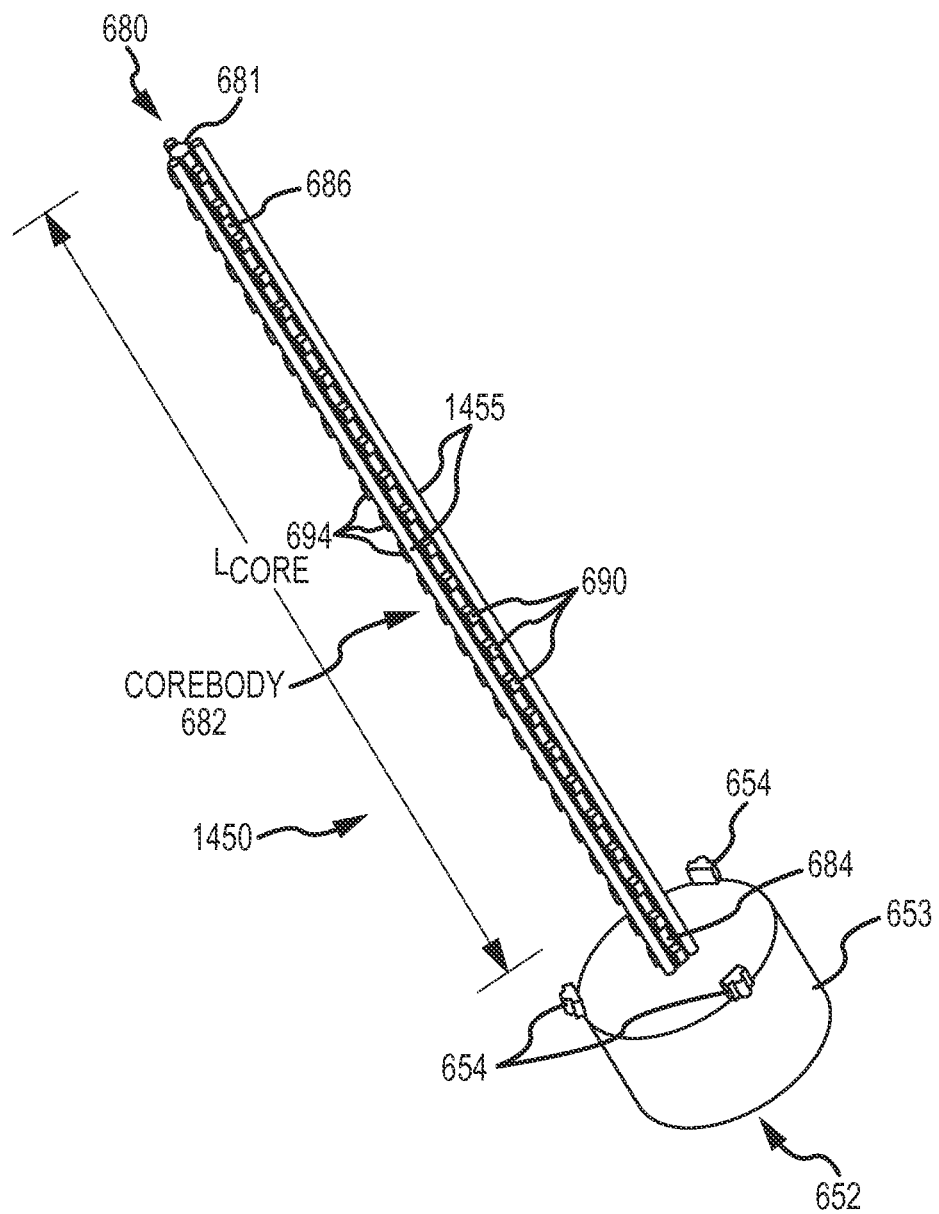
FIG. 14 illustrates another penumbra activator (or lighting support structure) that is similar to other illustrated activators but further modified to include lighting tubes or elongated light sources between each string or set of point light sources on the outer surface of the central core or body.

In other cases, the space between adjacent pairs of light sources can be lit, too. FIG. 14 shows a penumbra activator 1450 in which elongated lights 1455 are positioned between light sources 690, 692, and 694, and the lights 1455 may be powered on an ongoing basis or only when facing away from the retroreflector sheet. The lights 1455 may be provided with fluorescent or CCFL tubes positioned on the sides/faces of the core body 682 that are free of the light sources 690, 692, 694. In other cases, the lights 1455 are provided with electroluminescent wire. These lights 1455 may be the same color as an adjacent set of lights 690, 692, 694 but may be selected to be somewhat dimmer (or a lower brightness level).

Figure 15:
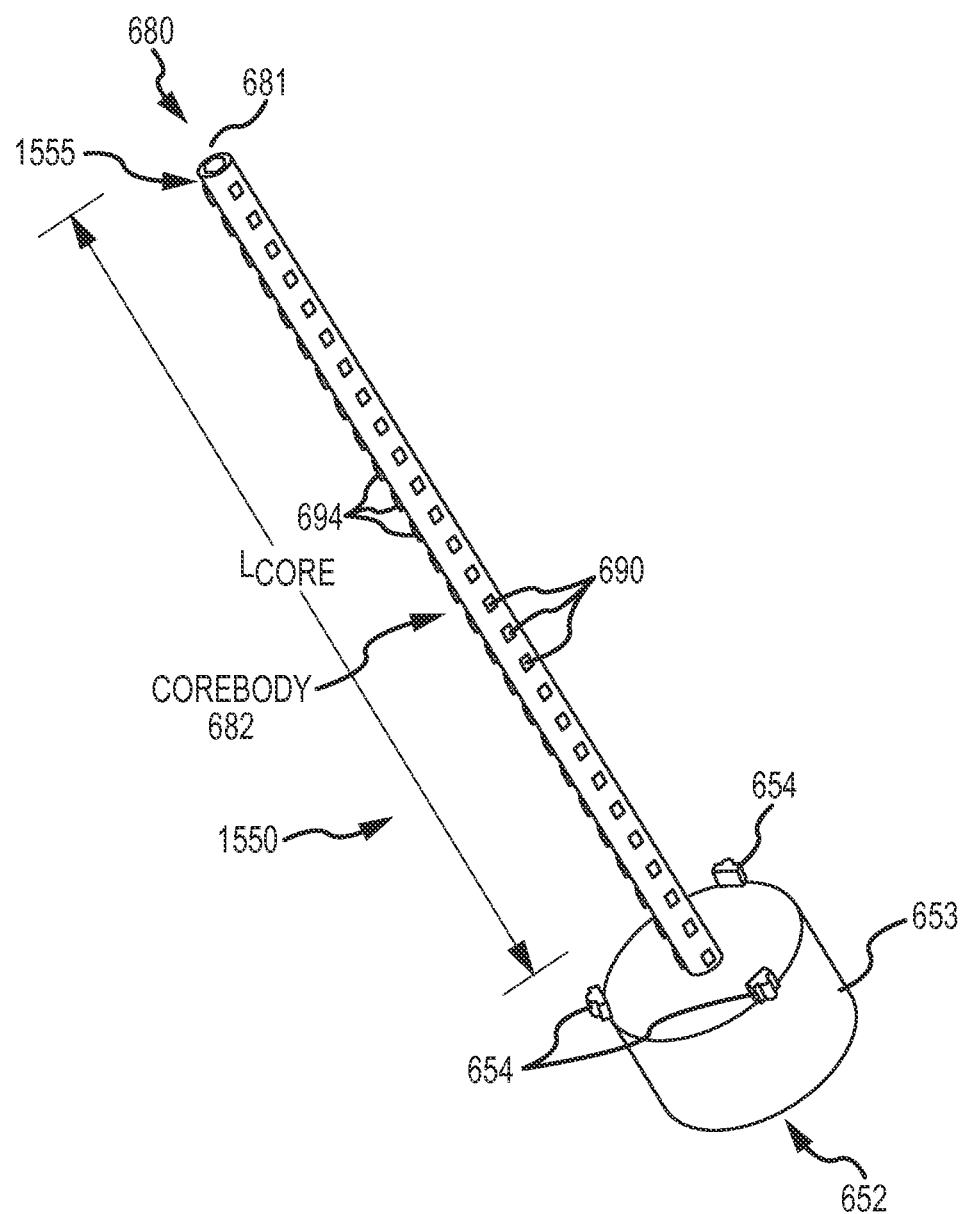
FIG. 15 illustrates another penumbra activator or lighting support structure that is configured to include core cover or body skin that may be positioned on the core/body so as to be interposed between the light sources and be formed of materials (e.g., phosphorescent or fluorescent plastic or the like) that can be lit by external light sources (on or off the activator)

FIG. 15 illustrates a penumbra activator 1550 that also provides illumination or lighting of the space between the rows of the light sources and also between adjacent ones of the light sources within each row. As shown, the penumbra activator 1550 includes a shell or sheath 1555 of a material that provides a level of illumination that is less than or about equal to that of a generated penumbra. For example, the lighting sheath may be formed of a phosphorescent plastic/material or a fluorescent plastic/material and be provided with holes through which the light sources 690, 692, 694 may extend/protrude so as to remain uncovered. In this way, the sheath 1555 may be lit using external lighting (e.g., off the activator such as a black light in the operating space or LEDs or other light source provided on the base) or may be charged by the onboard light sources 690, 692, 694 such as when these sources are lit while facing the retroreflective sheet.

Figure 16:
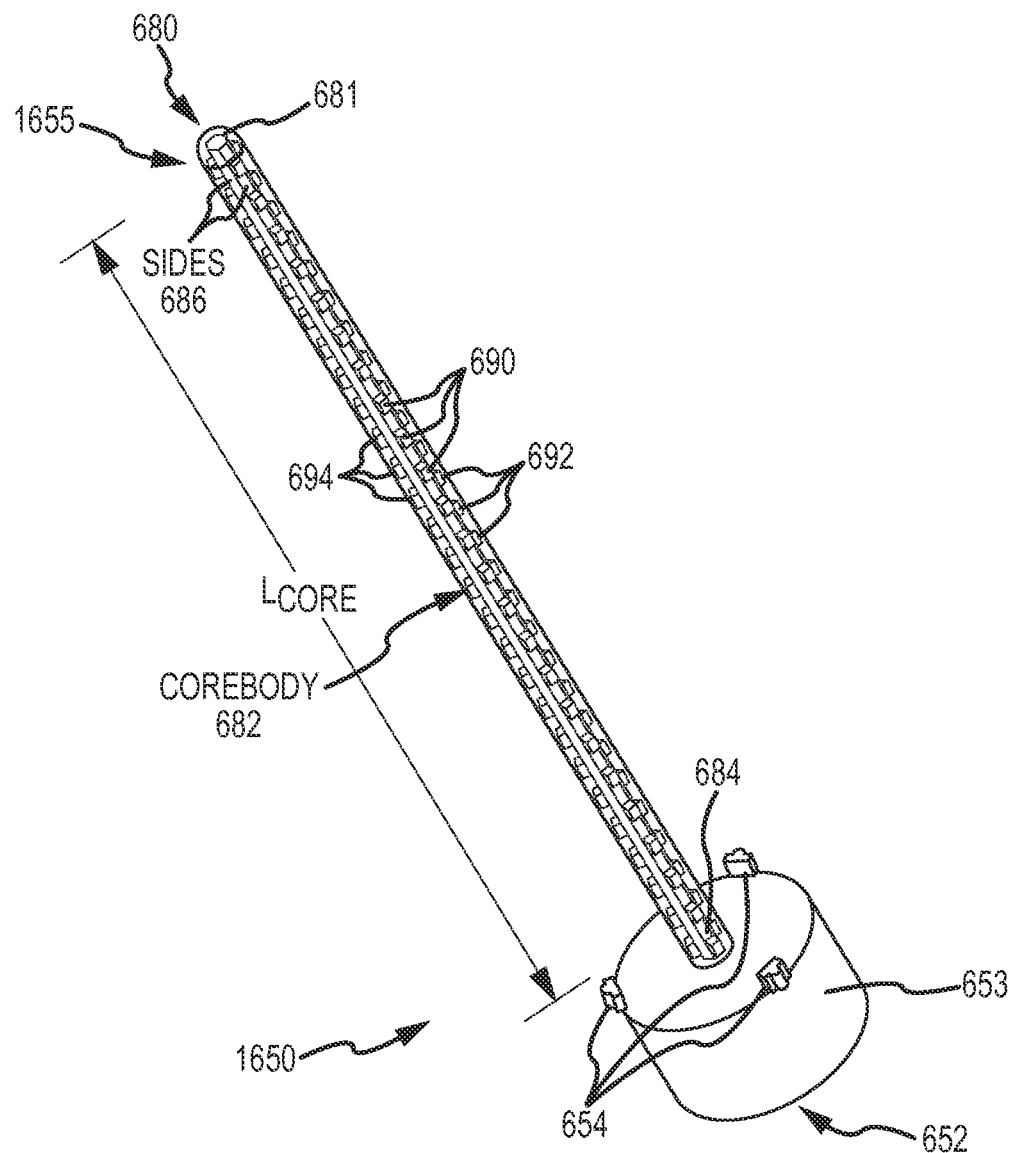
FIG. 16 illustrates a penumbra activator similar to that shown in FIG. 15 but including a shell or encasement over the sets of point light sources to create a desired lighting effect.

FIG. 16 illustrates another penumbra activator 1650 that is configured for lighting the support element 682 in the direction of the viewer. To this end, the activator 1650 includes a shell or tube 1655 that encases the core body 682 as well as the light sources 690, 692, 694, which may be desirable for protecting these components. The shell or encasement 1655 may be transparent or formed of a material that diffuses light (or a combination of such materials). The shell or encasement 1655 can be configured to hid the light sources 690, 692, 694 by diffusion, total internal reflection, or some combination thereof. In other cases, the shell 1655 may be a gel filter that can be placed over the light sources or the light sources may be cast into or painted with filtering material to provide the shell 1655. In some embodiments, blue LEDs or the like may be used to energize the shell 1655 such as when it is formed of conversion phosphor.

Figure 17:
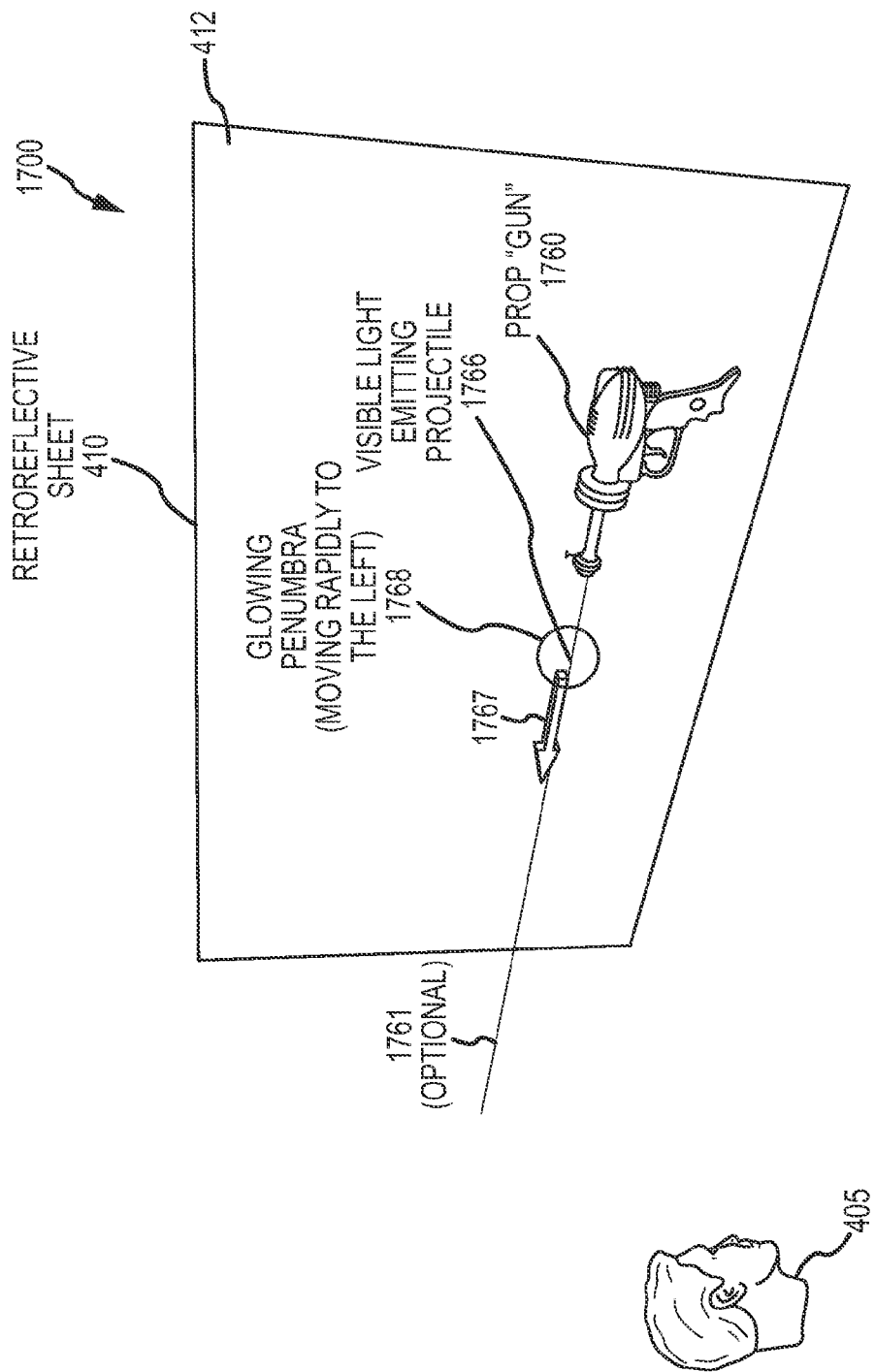
FIG. 17 illustrates another special effects system using a retroreflective sheet and is shown to include a gun or ejector for projecting a projectile that includes a light source(s) such that a penumbra is visible about the flying projectile.

FIG. 17 illustrates another special effects system 1700 using a retroreflective sheet 410 with a reflective surface to create a special effect for a viewer 405. The system 1700 includes a prop gun or projectile launching device 1760 that is configured to for projecting a projectile 1766 in the space between the viewer 405 and the surface 412 of the retroreflective sheet 410. The projectile 1766 includes a light source(s) emitting a visible light at least partially in the direction of the surface 412 such that penumbra 1768 is generated about the edges/surfaces of the projectile 1766 as it flies (as shown with arrow 1767) in front of or across the surface 412 of the sheet 410. The projectile 1766 may be free flying such as at a slow speed, e.g., the speed for an arrow or even a launched foam projectile or alternatively a guide wire 1761 may be provided to cause the projectile to follow a desired projectile path as it "flies" 1767.

In some embodiments, the projectile 1766 may include a small LED or other light source that is battery powered. In other cases, the projectile 1766 may be powered by charged lines making up or on guide line 1761. In other cases, the visible light emitting projectile 1766 may be made incandescent by chemical means (e.g., a "sparkler" type fireworks effect may be used to provide the light directed from the projectile 1766 toward the surface 412 to create the penumbra or glowing effect 1768).

Figure 18:
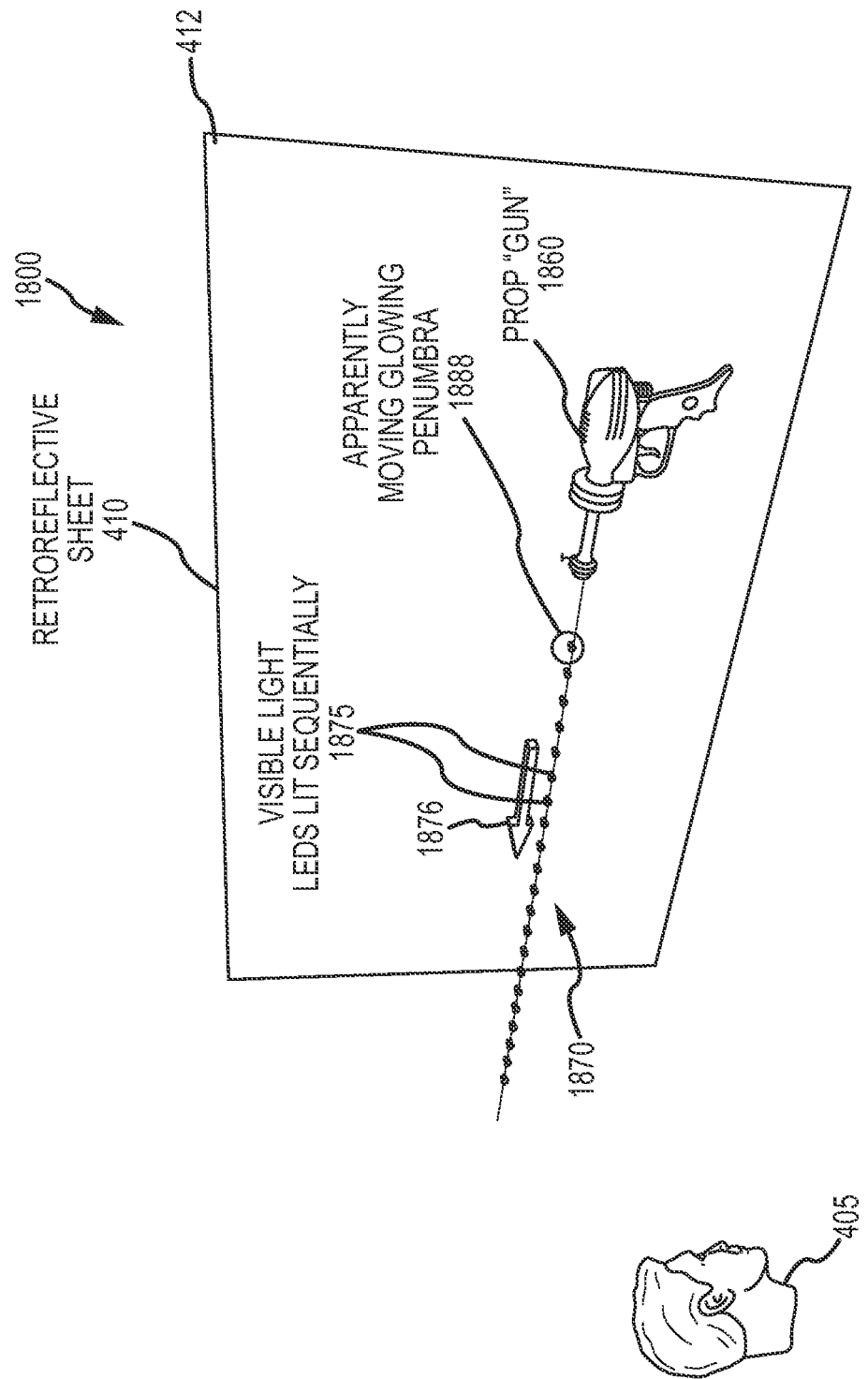
FIG. 18 illustrates a special effects system similar to that of FIG. 17 but that is modified to includes a string or line of point light sources that can be sequentially activated relative to an outlet of a gun/ejector to provide a flying or moving penumbra associated with a virtual projectile from the gun/ejector.

FIG. 18 illustrates an FX system 1800 similar to that of FIG. 17 but configured to provide a virtual projectile using a penumbra or glowing effect illusion. In the system 1800, the gun or projectile launcher 1860 may be used to trigger sequential turning on and off of light sources 1875 of a light source assembly 1870. In one implementation, the light sources 1875 are a string of LEDs positioned on a support wire a distance from the surface 412, and the LEDs are sequentially turned on and off along the length of the wire of assembly 1870 to create a penumbra or glowing halo/ball 1880 that moves as shown by arrow 1876 along the wire with light sources 1875. In other cases, the light sources 1875 are EL wire segments that are sequentially lit. In other cases, though, the light sources 1875 are provided by selectively illuminating segments of a thin surface (a wire or the like) with a scanned visible light laser beam or the like, and this light is then directed toward the surface 412 where it is reflected toward the lit segments resulting in the moving 1876 penumbra 1880.

Figure 19:
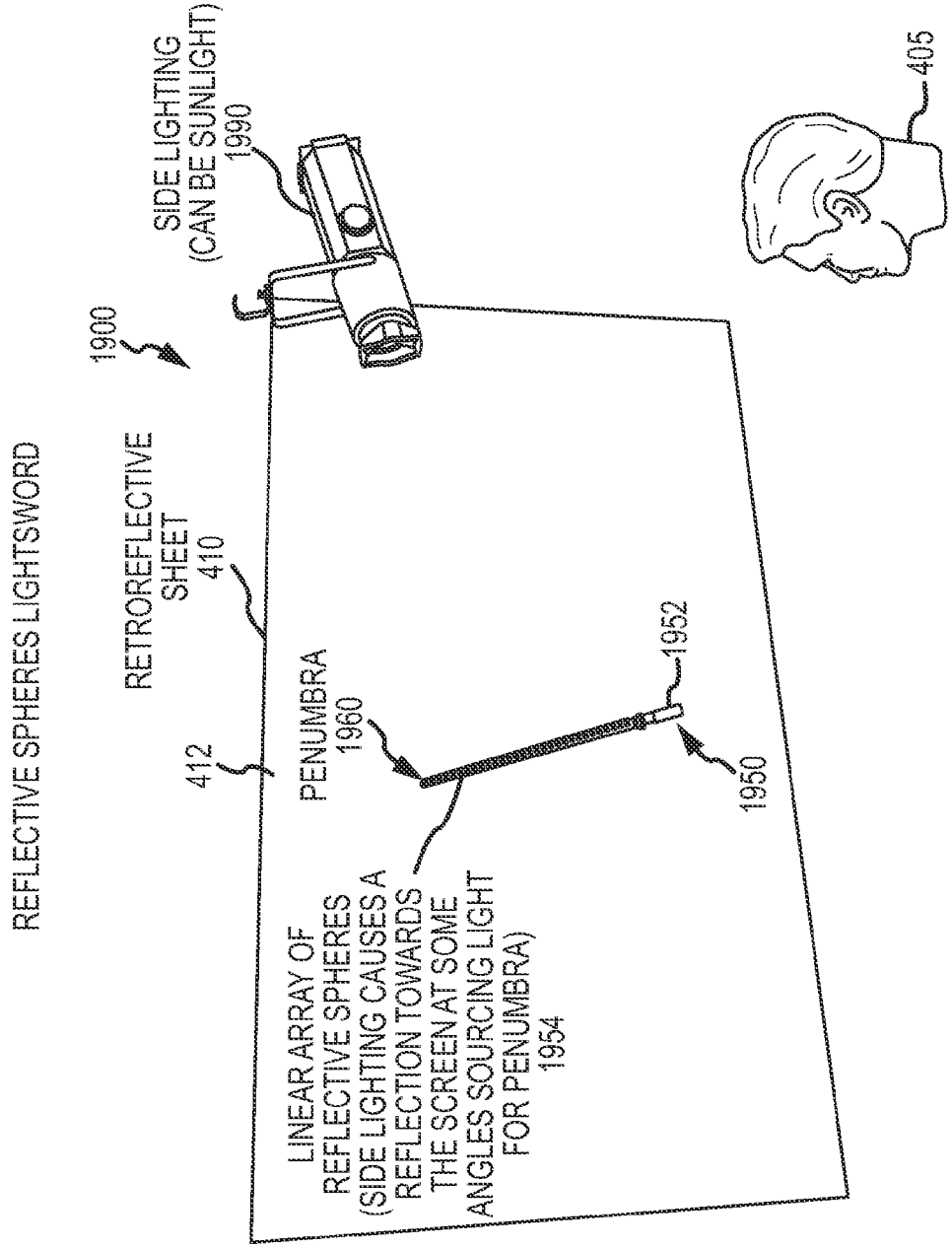
FIG. 19 illustrates another special effects system according to the present description in which the penumbra activator is configured to carry a plurality of reflectors and an external light source is used to project light onto these reflectors and then onto the surface of the retroreflector sheet to create a penumbra.

FIG. 19 illustrates an FX system 1900 that includes a retroreflective sheet 410 with a reflective surface 412 facing a viewer 405. A penumbra 1960 is selectively generated for viewing by the viewer 405 about a penumbra activator 1950. The activator 1950 includes a base or hilt 1952 that may include a switch for controlling operation of a light source 1990, which may be provided in the form of a side lighting projector that directs light onto the penumbra activator 1950. In other cases, the side lighting source 1990 may be the Sun or ambient/environment light entering the viewing/operating space containing the penumbra activator 1950. The light source assembly of activator 1950 includes plurality of reflective elements that reflect the light from the side lighting source 1990 toward the surface 412 so as to create a penumbra 1960 about the light source assembly 1954. In one embodiment, for example, the light source assembly 1954 includes a plurality of linearly arranged reflective spheres provided in a transparent to translucence tube/casing. Side lighting causes a reflection from the spheres toward the screen surface 412 at some angles with this directed light generating a penumbra 1960 when it is reflected imperfectly by the retroreflective sheet 410.

FIG. 20 illustrates another useful embodiment of an FX system 2000 that selectively generates a penumbra or glowing effect 2041 that extends out from a base or hilt 2040. In the system 2000, though, the penumbra 2041 is generated in space relative to the hilt 2040 and not about a light source/light source support. To this end, a viewer 2005 is observing a physical base or hilt 2040 positioned in a viewing or operating space. The hilt 2040 is positioned a distance apart from a beam splitter 2030 (e.g., a beam splitter arranged at a 45 degree angle to a vertical plane passing through the hilt 2040).

A retroreflector 2010 is positioned on a first side of the beam splitter 2030 (spaced apart a distance from the beam splitter 2030) with its reflective surface 2012 facing the beam splitter 2030.

A linear light source 2020 is included in the FX system 2000 and is positioned on a second side of the beam splitter 2030 (opposite the retroreflector 2010 and spaced apart from the beam splitter 2030 so as to cause the penumbra 2041 to be aligned with the hilt 2040 or to extend out from the hilt 2041). During operation of the system 2000, the linear light source 2020 directs an elongated or strip of light toward the retroreflector sheet 2010. The directed light passes through the beam splitter 2030 and strikes the surface 2012 of the retroreflective sheet 2010 where it is reflected directly back toward the linear light source 2020 but in an imperfect manner as discussed above. However, the beam splitter 2030 acts to reflect a portion of the light from the surface 2012 toward the viewer 2005. Due to the imperfect reflection, a penumbra 2041 is generated by this light redirected by the beam splitter 2030 with the shape/size of the penumbra 2041 defined by the shape/size of the light source 2020 and with the location of the penumbra 2041 set by the relative separations between the source 2020 and surface 2012 and surface 2012 and beam splitter 2030.

The system 2000 is useful for illustrating that a beam splitter may be provided in any of the FX systems described herein to modify the location of the generated penumbra (e.g., move the penumbra away from a location directly about the light sources that provide the light the creates the penumbra). In this manner, a glowing effect can be placed on nearly any object (e.g., can beam split a penumbra onto any item in a set or display system).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

Many of our inventive configurations to create fog free special effects are optimized by directing all, or substantially all, of the generated light towards the retro-reflective surface(s). However, there are times when the effect is actually augmented by having the light from the source(s) both heading towards the retro-reflector (and thus reflected) and also the direct light from the source heading towards the viewer (e.g., visible). For instance, in the case where the appearance of a bright star, with a surrounding penumbra, is desired, this can be accomplished by using an undirected point source (such as the end of a fiber optic light guide driven by a remote optical source). Light leaving the end of the fiber will be perceived by the viewer as a central bright source of light, and light leaving the source(s) and heading towards the retro-reflector will be viewed as an additive penumbra.

In other cases, the "prop" discussed in this description may be, for instance, a human hand (e.g., holding a bright point source held away from the direct sight of the viewer). In this case, the hand will block the direct light coming from the point source, but the light leaving the point source in the direction of the retroreflector will create a penumbra surrounding the hidden light. This can, for instance, provide an illusion of a person holding a glowing ingot of "treasure."

Finally, as will be clear to the reader, this effect can be used to create a glow around a person's head or can be used in the case of a small toy to create a magical aura surrounding the toy. Thus, for instance in toy packages (set back some distance from the actual toy), single or multiple lights behind the toy, facing backwards towards the retroreflective packaging can make the toy seem magical and standout amongst crowded store shelves. In this case, the toy itself blocks the viewer's direct view of the light source but allows the viewer to see the penumbra. Again, the light sources may be formed using nearly any light source(s) such as an end of an optical fiber, an LED light, an incandescent light, a fluorescent light, a theatrical sparkler, and the like.

We claim:

1. A system for generating a glowing effect, comprising:
a sheet of retroreflective material with a reflective surface facing into a viewing space; and
a penumbra activator, positioned within the viewing space, including a support element and a plurality of light sources mounted on a surface of the support element,
wherein the light sources operate to direct light towards the reflective surface,
wherein a penumbra is generated adjacent edges of the support element proximate to mounting locations of the light sources, and
wherein the penumbra activator further comprises a controller operating the light sources to direct the light toward the reflective surface only when the surface of the support element faces the reflective surface.

2. The system of claim 1, the penumbra activator further comprising a controller for sequentially activating wherein the controller operates to sequentially activate the light sources to modify a length of the penumbra over an operating time for the system.

3. The system of claim 2, wherein the light sources comprise spaced apart light emitting diodes (LEDs) aligned linearly along a length of the surface of the support element.

4. The system of claim 1, further comprising means for determining when the surface of the support element faces the reflective surface.

5. The system of claim 1, wherein the support element is rotatable by the controller to orient the surface of the support element to face the reflective surface on an ongoing basis during the operating time for the system. one of the first and second sets of the light sources to direct light toward the reflective surface to generate a penumbra about the core body, wherein the assembly includes an orientation sensing device operating to determine whether the first side or the second side of the core body faces the reflective surface and wherein the controller operates the one of the first and second sets of the light sources to provide the directed light toward the reflective surface based on the determining operation.

6. The system of claim 1, wherein a color filter is provided proximate to the reflective surface between the reflective surface and the penumbra activator, whereby a color of the penumbra differs from a color of the light directed toward the reflective surface from the light sources.

7. The system of claim 1, further comprising a sheet of optically porous material between the reflective surface and the penumbra activator.

8. The system of claim 7, further comprising a video projector projecting an image onto the sheet of optically porous material.

9. The system of claim 1, further comprising a beam splitter between the penumbra activator and the reflective surface, whereby the penumbra is positioned at a location in the viewing space a distance from the light sources.

10. A glow effect generation system, comprising a retroreflective sheet with a reflective surface, and an assembly including a base, a controller housed within the base, and a light source assembly mounted on the base, wherein the light source assembly includes a core body extending outward from the base, a first set of light sources on a first side of the core body, and a second set of light sources on a second side of the core body, and wherein the controller operates one of the first and second sets of the light sources to direct light toward the reflective surface to generate a penumbra about the core body, wherein the assembly includes an orientation sensing device operating to determine whether the first side or the second side of the core body faces the reflective surface and wherein the controller operates the one of the first and second sets of the light sources to provide the directed light toward the reflective surface based on the determining operation.

11. The system of claim 10, wherein the controller illuminates the one of the first and second sets of the light sources m a sequential manner to cause the penumbra to change m length over time.

12. The system of claim 10, wherein the assembly further includes a filter of a first color over the first set of light sources and a filter of a second color differing from the first color over the second set of light sources.

13. The system of claim 10, wherein the assembly further includes elongated lighting elements on the core body in spaces between the first and second sets of light sources.

14. The system of claim 10, wherein the assembly further includes a sheath covering or extending between the light sources and wherein the sheath is formed of one of: a diffusive material, a material creating total internal reflection, a phosphorescent material, and a fluorescent material.

15. A special effects system, comprising:
a sheet of retroreflective material;
a strip of spaced apart light sources positioned or positionable to direct light toward the sheet of retroreflective material; and
a controller selectively illuminating one or more of the light sources to generate a penumbra about the illuminated one or more of the light sources, further including an orientation sensingdevice determining when the strip of spaced apart light sources is facing the sheet of retroreflective material and wherein the controller performs the illuminating of the one or more of the light sources only in response to the determining by the orientation sensing device.

16. The system of claim 15, further including a projectile launcher triggering operation of the controller to illuminate a plurality of the light sources in a sequential manner to cause the penumbra to travel from a first location proximate to the projectile launcher to a second location distal to the projectile launcher.

17. The system of claim 15, wherein the orientation sensing device is an IR-based assembly, a magnetic tracking assembly, or a video tracking system.

18. The system of claim 15, further comprising a tubular filter extending over the strip of light sources, the tubular filter comprising a first section coloring light output from the light sources a first color and a second section coloring light output from the light sources a second color differing from the first color, and wherein the tubular filter is rotated by the controller to cover the light sources first with the first second and second with the second section.

19. The system of claim 15, wherein the light sources are LEDs spaced apart by at least 0.25 inches and wherein the controller sequentially illuminates the LEDs to cause the penumbra to move or to change in length or shape of the penumbra over time.

* * * * *